US012801070B2

(12) United States Patent
Sato et al.

(10) Patent No.: US 12,801,070 B2
(45) Date of Patent: Nov. 17, 2026

(54) IMAGE FORMING APPARATUS

(71) Applicant: FUJIFILM Business Innovation Corp., Tokyo (JP)

(72) Inventors: Tomonori Sato, Kanagawa (JP); Nobuyoshi Hattori, Kanagawa (JP); Tsuyoshi Mabara, Kanagawa (JP); Isamu Adachi, Kanagawa (JP); Miho Morita, Kanagawa (JP); Tomomi Ishida, Kanagawa (JP); Yuji Otsuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 101 days.

(21) Appl. No.: 18/156,407

(22) Filed: Jan. 19, 2023

(65) Prior Publication Data

US 2024/0019802 A1 Jan. 18, 2024

(30) Foreign Application Priority Data

Jul. 12, 2022 (JP) ................................ 2022-111779

(51) Int. Cl.
*G03G 15/23* (2006.01)
*G03G 15/00* (2006.01)

(52) U.S. Cl.
CPC ......... *G03G 15/234* (2013.01); *G03G 15/602* (2013.01); *G03G 2215/00586* (2013.01)

(58) Field of Classification Search
CPC ....... G03G 2215/00586; G03G 15/602; G03G 15/234
See application file for complete search history.

(56) References Cited

U.S. PATENT DOCUMENTS 9,944,489 B2 4/2018 Arikawa et al.
2007/0134036 A1 * 6/2007 Sato .................. G03G 21/1619 399/367

(Continued)

FOREIGN PATENT DOCUMENTS

JP H0470855 6/1992
JP H08337347 12/1996

(Continued)

OTHER PUBLICATIONS

"Notice of Reasons for Refusal of Japan Counterpart Application", issued on May 12, 2026, with English translation thereof, p. 1-p. 6.

*Primary Examiner* — David H Banh
(74) *Attorney, Agent, or Firm* — JCIPRNET

(57) ABSTRACT

An image forming apparatus includes: an image forming unit that forms an image onto a recording medium; an image reading unit that is disposed above the image forming unit in an up-down direction, transports a document, and reads an image formed on the document; a first output section that is provided in a connection section connecting the image forming unit and the image reading unit to each other in the up-down direction and to which the document read by the image reading unit and transported in a width direction of the image forming unit is output; a second output section that is provided below the first output section in the connection section and to which the recording medium having the image formed thereon by the image forming unit is output; and a rotating member that serves as a front portion of the first output section in a depth direction of the image forming unit, is rotatable by a rotating shaft disposed at an upstream side in an output direction of the document, and switches between an output position from which the document is output and a descent position to which a downstream (Continued)

end of the rotating member in the output direction descends relative to the output position.

11 Claims, 16 Drawing Sheets

(56) References Cited

U.S. PATENT DOCUMENTS

| | | | | |
|---|---|---|---|---|
| 2012/0044541 | A1* | 2/2012 | Kato | G03G 15/5025 358/448 |
| 2012/0061902 | A1* | 3/2012 | Ino | B65H 31/26 271/265.01 |
| 2014/0086602 | A1* | 3/2014 | Suzuki | G03G 15/5008 399/38 |
| 2015/0248098 | A1* | 9/2015 | Izumichi | G03G 15/6538 271/314 |

FOREIGN PATENT DOCUMENTS

| | | |
|---|---|---|
| JP | 2005306614 | 11/2005 |
| JP | 2007055722 | 3/2007 |
| JP | 2007159022 | 6/2007 |
| JP | 2012062133 | 3/2012 |
| JP | 2014066881 | 4/2014 |
| JP | 2017065828 | 4/2017 |
| JP | 2017077965 | 4/2017 |

* cited by examiner

IMAGE FORMING APPARATUS

CROSS-REFERENCE TO RELATED APPLICATIONS

This application is based on and claims priority under 35 USC 119 from Japanese Patent Application No. 2022-111779 filed Jul. 12, 2022.

BACKGROUND

(i) Technical Field

The present disclosure relates to image forming apparatuses.

(ii) Related Art

Japanese Unexamined Patent Application Publication No. 2017-077965 discloses a sheet loading device that includes a sheet loading section having a loading surface that holds an output sheet, and a movable section provided at one end of the loading surface in the width direction orthogonal to the sheet output direction and forming a space between the loading surface and the sheet.

Japanese Unexamined Patent Application Publication No. 8-337347 discloses an image forming apparatus including: an image forming unit that forms image information onto a sheet, an apparatus housing that accommodates the image forming unit; a scanner that is disposed above the apparatus housing with a space interposed therebetween, reads original image information, converts the information into an electric signal, and supplies the electric signal to the image forming unit; and a supporter that supports the scanner above the apparatus housing with a space interposed therebetween. In the image forming apparatus, a paper output tray movable in a direction substantially orthogonal to the paper output direction is provided at the upper surface of the apparatus housing.

Japanese Unexamined Patent Application Publication No. 2007-055722 discloses a sheet processing apparatus including an ascendable-descendible sheet loading unit that holds a sheet and an output unit that outputs a sheet onto the sheet loading unit. The sheet loading unit includes a tray supported in an ascendable-descendible manner and a loading surface member supported above the tray and movable toward a front surface along a wall surface located toward the output unit. In a state where the loading surface member holds the sheet, the sheet is unloadable by drawing the load surface member toward the front surface.

SUMMARY

Aspects of non-limiting embodiments of the present disclosure relate to an image forming apparatus that may achieve enhanced ease of unloading of a small-size document, as compared with a configuration where a portion of an output section to which a document is output and that is disposed at the front side of an image forming unit in the depth direction is rotated by a rotating shaft extending in the width direction of the image forming unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: an image forming unit that forms an image onto a recording medium; an image reading unit that is disposed above the image forming unit in an up-down direction, transports a document, and reads an image formed on the document; a first output section that is provided in a connection section connecting the image forming unit and the image reading unit to each other in the up-down direction and to which the document read by the image reading unit and transported in a width direction of the image forming unit is output; a second output section that is provided below the first output section in the connection section and to which the recording medium having the image formed thereon by the image forming unit is output; and a rotating member that serves as a front portion of the first output section in a depth direction of the image forming unit, is rotatable by a rotating shaft disposed at an upstream side in an output direction of the document, and switches between an output position from which the document is output and a descent position to which a downstream end of the rotating member in the output direction descends relative to the output position.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described in detail below with reference to the drawings.

First Exemplary Embodiment

Figure 1:
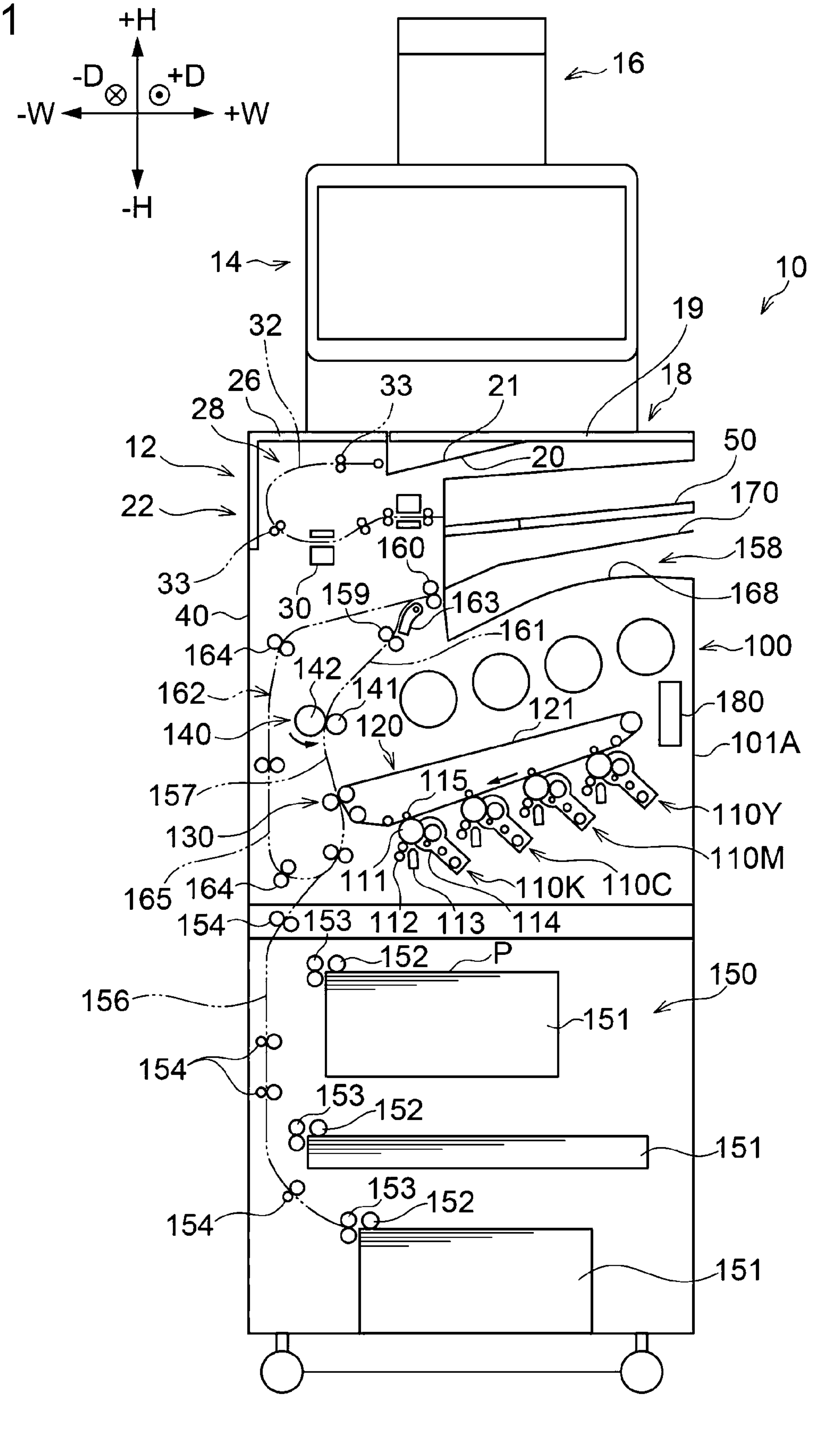
FIG. 1 schematically illustrates the configuration of an image forming apparatus according to a first exemplary embodiment.

FIG. 1 schematically illustrates the configuration of an image forming apparatus according to a first exemplary embodiment of the present disclosure. In a front view of an image forming apparatus 10 from the side where a user (not shown) is standing, an apparatus up-down direction (i.e., vertical direction), an apparatus width direction (i.e., horizontal direction), and an apparatus depth direction (i.e., horizontal direction) are defined as an H direction, a W direction, and a D direction, respectively. Furthermore, when a first side and a second side in each of the apparatus up-down direction, the apparatus width direction, and the apparatus depth direction are to be differentiated from each other, the upper side is defined as a +H side, the lower side is defined as a −H side, the right side is defined as a +W side, the left side is defined as a −W side, the rear side is defined as a −D side, and the front side is defined as a +D side in the front view of the image forming apparatus 10. The same applies to the drawings other than FIG. 1.

Overall Configuration of Image Forming Apparatus

As shown in FIG. 1, the image forming apparatus 10 includes a document reading device 12, a panel 14, and an image forming unit 100. The document reading device 12 is an example of an image reading unit. The document reading device 12 reads images formed on the front and rear faces of a document G (not shown) and converts the read images into electronic data. The image forming unit 100 is disposed below the document reading device 12, forms a copy image of the document G based on the electronic data converted from the images by the document reading device 12, and records the copy image onto recording paper P as an example of a recording medium. The panel 14 is a touchscreen display disposed between a camera unit 16 and a document tray 18 to be described later. The touchscreen display serves as a display that allows the user to perform a touch input operation and that displays information about the image forming apparatus 10 toward the +D side.

Image Forming Unit 100

As shown in FIG. 1, the image forming unit 100 includes multiple image forming devices 110 that form toner images by using toners serving as developers, and an intermediate transfer device 120 that retains the toner images formed by the respective image forming devices 110 and transports the toner images to a second transfer position where the toner images are second-transferred onto the recording paper P. The image forming unit 100 also includes a sheet feeding device 150 that accommodates recording paper P to be fed to the second transfer position of the intermediate transfer device 120 and transports the recording paper P thereto, and a fixing device 140 that fixes the toner images second-transferred on the recording paper P by the intermediate transfer device 120 onto the recording paper P. The image forming apparatus 10 includes an apparatus body 101A as a housing. The image forming unit 100 is provided inside the apparatus body 101A. A double-dot chain line in FIG. 1 indicates a first transport path along which the recording paper P is transported within the apparatus body 101A.

The image forming devices 110 include four image forming devices 110Y, 110M, 110C, and 110K that are dedicated to forming toner images of four colors, namely, yellow (Y), magenta (M), cyan (C), and black (K). These four image forming devices 110 (Y, M, C, and K) are arranged in a single row in an inclined state such that the yellow (Y) image forming device 110Y is positioned higher at the +W side in the W direction and the black (K) image forming device 110K is positioned lower at the −W side in the W direction within the internal space of the apparatus body 101A. If the four colors are not to be differentiated from one another, the terms yellow (Y), magenta (M), cyan (C), and black (K) may sometimes be omitted such that the four image forming devices 110 (Y, M, C, and K) may simply be referred to as the image forming devices 110 or the image forming devices 110 (Y, M, C, and K).

Each of the image forming devices 110 (Y, M, C, and K) includes a rotating photoconductor drum 111 serving as an image bearing member. The photoconductor drum 111 is surrounded by a charging device 112 that electrostatically charges the peripheral surface of the photoconductor drum 111, an exposure device 113 that forms an electrostatic latent image by irradiating the electrostatically-charged peripheral surface of the photoconductor drum 111 with light based on image information (signal), and a developing device 114 that develops the electrostatic latent image into a toner image by using the toner of the corresponding color (Y, M, C, or K). The photoconductor drum 111 is further surrounded by a first transfer device 115 that transfers the corresponding toner image developed by the developing device 114 onto the intermediate transfer device 120, and a drum cleaning device 116 that cleans the photoconductor drum 111 having undergone the first transfer process by removing deposits, such as residual toner, from the peripheral surface. The first transfer device 115 includes a first transfer roller.

The intermediate transfer device 120 is disposed above the image forming devices 110 (Y, M, C, and K) in the H direction. The intermediate transfer device 120 includes an intermediate transfer belt 121 that rotates in the direction of an arrow while traveling through the first transfer positions between the photoconductor drums 111 and the first transfer devices 115, and multiple support rollers that rotatably support the intermediate transfer belt 121 from the inner surface thereof. Furthermore, the intermediate transfer device 120 includes a second transfer device 130 that is disposed on the outer peripheral surface of the intermediate transfer belt 121 and that second-transfers the toner images on the intermediate transfer belt 121 onto the recording paper P.

The fixing device 140 includes a heating roller 141 that rotates and whose surface temperature is maintained at a predetermined temperature, and also includes a pressing roller 142 that is rotated by being in contact with the heating roller 141. The fixing device 140 applies heat and pressure onto the recording paper P transported from the second transfer device 130 so as to fix the toner images transferred on the recording paper P onto the recording paper P.

The sheet feeding device 150 is disposed below the image forming devices 110 (Y, M, C, and K). The sheet feeding device 150 includes multiple sheet containers 151 that accommodate sheets of recording paper P of predetermined sizes and types in a stacked state, and also includes delivery devices 152 and 153 that deliver the sheets of recording paper P one-by-one from the sheet containers 151.

Multiple pairs of sheet transport rollers 154 that transport the recording paper P delivered from the sheet feeding device 150 to the second transfer position and a sheet-feeding transport path 156 constituted of a transport guide (not shown) are provided between the sheet feeding device 150 and the second transfer device 130. Furthermore, a sheet transport path 157 for transporting the recording paper P having undergone the second transfer process to the fixing device 140 is provided between the second transfer device 130 and the fixing device 140. Moreover, an area near a sheet output section 158 provided in the apparatus body 101A is provided with an output transport path 161 equipped with pairs of sheet output rollers 159 and 160 for outputting the recording paper P having undergone the fixing process to the sheet output section 158. The sheet output section 158 is an example of a second output section.

The sheet output section 158 includes an output tray 168. The sheet output section 158 outputs the recording paper P transported from the fixing device 140 onto the output tray 168 by using the pair of sheet output rollers 159.

Furthermore, the image forming apparatus 10 includes a duplex unit 162 for forming images onto both faces of the recording paper P. The image forming apparatus 10 includes a sheet guide 170 that is located above the sheet output section 158 and that supports the recording paper P during a duplex image forming process. The sheet guide 170 is an example of a supporter. When the pairs of sheet output rollers 159 and 160 transport the recording paper P having an image formed on one face thereof toward the sheet guide 170, the duplex unit 162 causes the pair of sheet output rollers 160 to rotate in the reverse direction while the pair of sheet output rollers 160 hold the trailing end of the recording paper P. Accordingly, the duplex unit 162 receives the recording paper P via a switch gate 163. The duplex unit 162 has multiple transport rollers 164 that transport the received recording paper P in a state where the front and rear faces thereof are inverted, and also has a duplex transport path 165 constituted of a transport guide (not shown).

The image forming apparatus 10 is provided with a controller 180 that controls the overall operation of the image forming apparatus 10. The controller 180 includes, for example, a central processing unit (CPU), a read-only memory (ROM), a random access memory (RAM), a bus that connects the CPU, the ROM, and so on to one another, and a communication interface.

Document Reading Device

The configuration of the document reading device 12 will now be described. The document reading device 12 is disposed above the image forming unit 100. The document reading device 12 includes the camera unit 16 and the document tray 18 disposed below the camera unit 16. The document reading device 12 also includes a load section 20 disposed below the document tray 18, a reading unit 22, and a document output section 50. The document output section 50 is an example of a first output section.

The document reading device 12 has a function for reading an image formed on the top face (i.e., front face) of a document G by using the camera unit 16 to capture the image of the document G placed on the document tray 18. The document reading device 12 also has a function for reading a document G disposed on the load section 20 by using the reading unit 22 while transporting the document G and then outputting the document G to the document output section 50.

The camera unit 16 is a so-called document camera and has a function for capturing an image of a document G placed on the document tray 18. For example, the camera unit 16 is aligned with the document tray 18 in correspondence with an A3-size document G having its longitudinal direction parallel to the apparatus width direction (i.e., W direction). For example, an A3-size document G is a maximum-size document capable of being image-captured by the camera unit 16.

The document tray 18 is disposed below the camera unit 16 and is where a document G to be image-captured by the camera unit 16 is to be disposed.

The load section 20 is disposed below the document tray 18 and has a rectangular base surface 21 that is recessed from a document placement surface of the document tray 18. The base surface 21 is inclined relative to the horizontal direction such that a −W end thereof is lower than a +W end thereof.

The document tray 18 includes, for example, a flat plate 19 disposed in the horizontal direction. The flat plate 19 is movable in the W direction. A −W end of the flat plate 19 moves toward the +W side by sliding relative to the load section 20, so that the upper side of the load section 20 becomes exposed. The load section 20 has a function for holding multiple documents G on the base surface 21 in the state where the upper side of the load section 20 is exposed. Moreover, in this state, the load section 20 is capable of holding a document G whose length in the apparatus width direction is larger than A4 (short side) in a state where the document G is disposed astride the upper surface of the slid flat plate 19 and the base surface 21.

The reading unit 22 is an auto document feeder and has a function for reading a document G disposed on the load section 20 while transporting the document G. The reading unit 22 includes a cover 26, a transporter 28, and a reader 30.

The document output section 50 is located below the load section 20 in the up-down direction and is provided above the sheet output section 158 of the image forming unit 100. The document output section 50 will be described later.

The transporter 28 includes a substantially-U-shaped transport path 32 extending from an inlet for the document G disposed on the load section 20 to an outlet of the sheet output section 158, and multiple roller members 33 disposed along the transport path 32. The transporter 28 uses the roller members 33 to take in the document G disposed on the load section 20 and transport the document G through the transport path 32 toward the document output section 50.

The reader 30 is a fixed-type image sensor disposed along the transport path 32 and has a function for reading images formed on the front and rear faces of the document G transported by the transporter 28.

The cover 26 is a panel-like member that has an L-shaped cross section as viewed from the apparatus depth direction and that covers the upper side of the reader 30.

Operation of Image Forming Apparatus

A basic image forming operation performed by the image forming apparatus 10 will now be described.

The following description relates to a full-color mode operation involving using the four image forming devices 110 (Y, M, C, and K) to form a full-color image constituted of a combination of toner images of the four colors (Y, M, C, and K).

When the image forming apparatus 10 receives image information from, for example, a personal computer (not shown) or the document reading device 12 and command information for requesting a full-color image forming operation (i.e., printing operation), the controller 180 activates, for example, the four image forming devices 110 (Y, M, C, and K), the intermediate transfer device 120, the second transfer device 130, and the fixing device 140.

In each of the image forming devices 110 (Y, M, C, and K), the photoconductor drum 111 rotates counterclockwise, and the charging device 112 electrostatically charges the surface of the photoconductor drum 111. Then, the exposure device 113 irradiates the electrostatically-charged surface of the photoconductor drum 111 with light emitted based on a signal of an image obtained in accordance with conversion into the corresponding color component (Y, M, C, or K), thereby forming an electrostatic latent image on the surface.

Subsequently, each of the image forming devices 110 (Y, M, C, and K) develops the electrostatic latent image of the corresponding color formed on the photoconductor drum 111 by electrostatically adhering toner thereto. As a result of this developing process, a toner image of the corresponding color is formed on the photoconductor drum 111.

Then, when the toner images formed on the photoconductor drums 111 of the image forming devices 110 (Y, M, C, and K) are transported to the respective first transfer positions, the first transfer devices 115 first-transfer the toner images sequentially in alignment with one another onto the intermediate transfer belt 121 of the intermediate transfer device 120.

Subsequently, the intermediate transfer device 120 rotates the intermediate transfer belt 121 to transport the first-transferred toner images to the second transfer position while retaining the first-transferred toner images. On the other hand, the sheet feeding device 150 feeds predetermined recording paper P to the sheet-feeding transport path 156 in accordance with the image forming operation. At the second transfer position, the second transfer device 130 collectively second-transfers the toner images on the intermediate transfer belt 121 onto the recording paper P.

Then, the recording paper P having the toner images second-transferred thereon is transported to the fixing device 140 via the sheet transport path 157. The fixing device 140 applies heat and pressure to the recording paper P so as to fix the unfixed toner images onto the recording paper P. Accordingly, an image constituted of a combination of the toner images of the four colors is formed on the recording paper P. The recording paper P having the toner images fixed thereon is output to the sheet output section 158 by the pair of sheet output rollers 159.

In the image forming apparatus 10, if images are to be formed on both faces of the recording paper P, the recording paper P is introduced to the duplex unit 162 after having an image formed on one face (i.e., front face) of the recording paper P in accordance with a process similar to that described above. More specifically, when the recording paper P having the image formed on one face thereof is to be transported toward the sheet guide 170 by the pairs of sheet output rollers 159 and 160, the pair of sheet output rollers 160 are rotated in the reverse direction while the pair of sheet output rollers 160 hold the trailing end of the recording paper P. Accordingly, the recording paper P is introduced to the duplex unit 162 via the switch gate 163. In the duplex unit 162, the multiple transport rollers 164 transport the recording paper P toward the second transfer position in a state where the front and rear faces thereof are inverted. Moreover, the second transfer device 130 transfers toner images onto the rear face of the recording paper P, and the fixing device 140 fixes the toner images onto the recording paper P, whereby an image is formed on the rear face of the recording paper P. The recording paper P having the images formed on both faces thereof in this manner is output to the sheet output section 158.

Relevant Configuration of Image Forming Apparatus

A relevant configuration of the image forming apparatus 10 according to the first exemplary embodiment will now be described.

Figure 2:
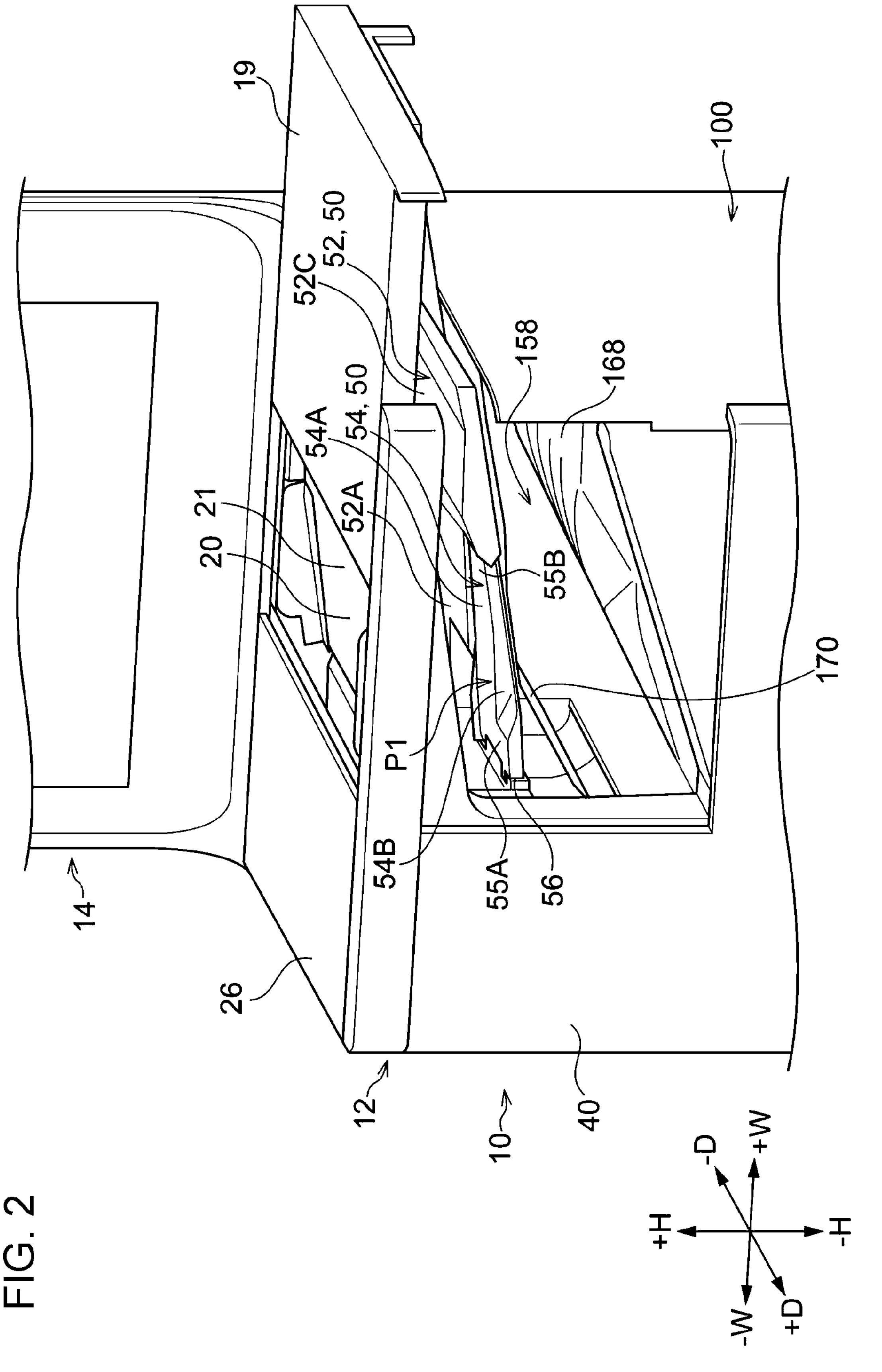
FIG. 2 is a perspective view illustrating a first output section and a second output section of the image forming apparatus according to the first exemplary embodiment in an enlarged state.

As shown in FIG. 2, the image forming apparatus 10 includes the aforementioned image forming unit 100 and the aforementioned document reading device 12 disposed above (i.e., at the +H side of) the image forming unit 100 in the up-down direction (see FIG. 1). The image forming apparatus 10 also includes a connection section 40 that connects the image forming unit 100 and the document reading device 12 to each other in the up-down direction (i.e., H direction). The connection section 40 is provided with the document output section 50. Furthermore, the image forming apparatus 10 is provided with the sheet output section 158 below the document output section 50 in the connection section 40 (see FIG. 3).

The image forming apparatus 10 is provided with the sheet guide 170 (see FIG. 3) above (i.e., at the +H side of) the sheet output section 158 in the up-down direction and below (i.e., at the −H side of) the document output section 50 in the up-down direction. As mentioned above, the sheet guide 170 has a function for supporting the recording paper P to be inverted when images are to be formed on both faces of the recording paper P.

Figure 8:
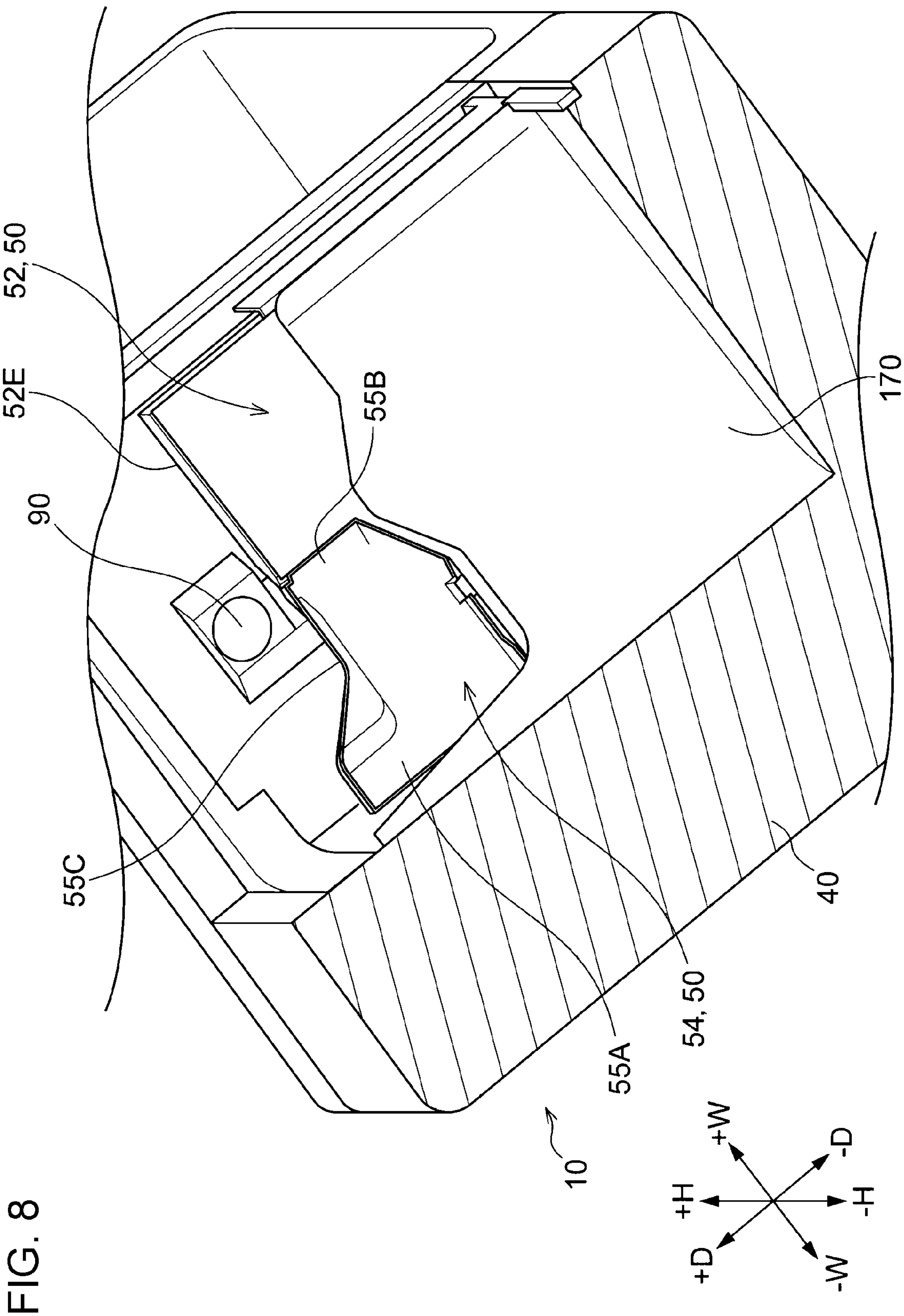
FIG. 8 is a perspective view illustrating the first output section of the image forming apparatus according to the first exemplary embodiment, as viewed from the rear side.

Moreover, the image forming apparatus 10 includes a lighting unit 90 disposed to emit light toward the document output section 50 and the sheet output section 158 (see FIG. 8).

Overall Configuration of Document Output Section 50

Figure 4A:
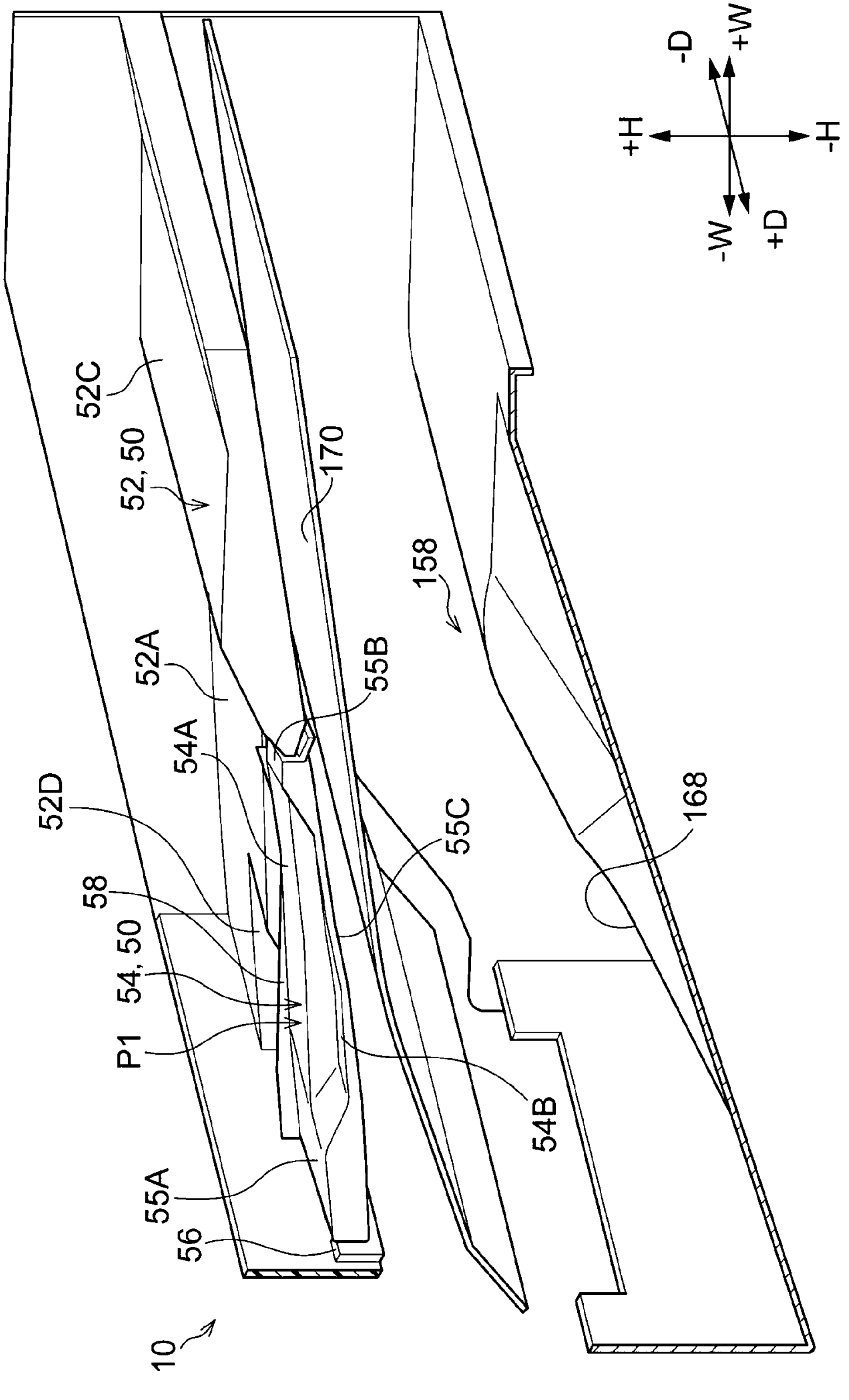
FIG. 4A is a perspective view illustrating a state where a rotating member has rotated to an output position in the first output section of the image forming apparatus according to the first exemplary embodiment.
Figure 4B:
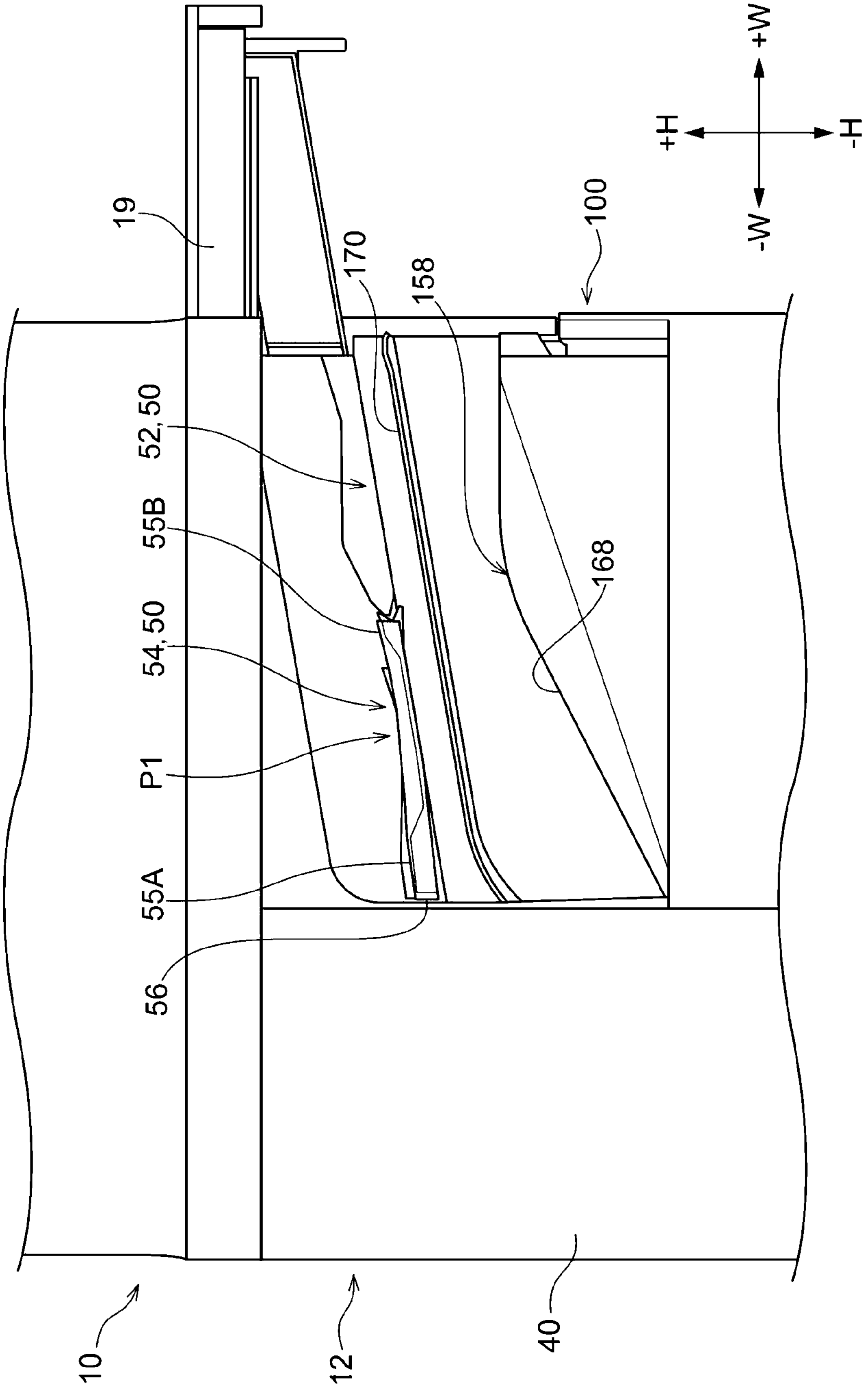
FIG. 4B is a front view illustrating a state where the rotating member has rotated to the output position in the first output section of the image forming apparatus according to the first exemplary embodiment.
Figure 5A:
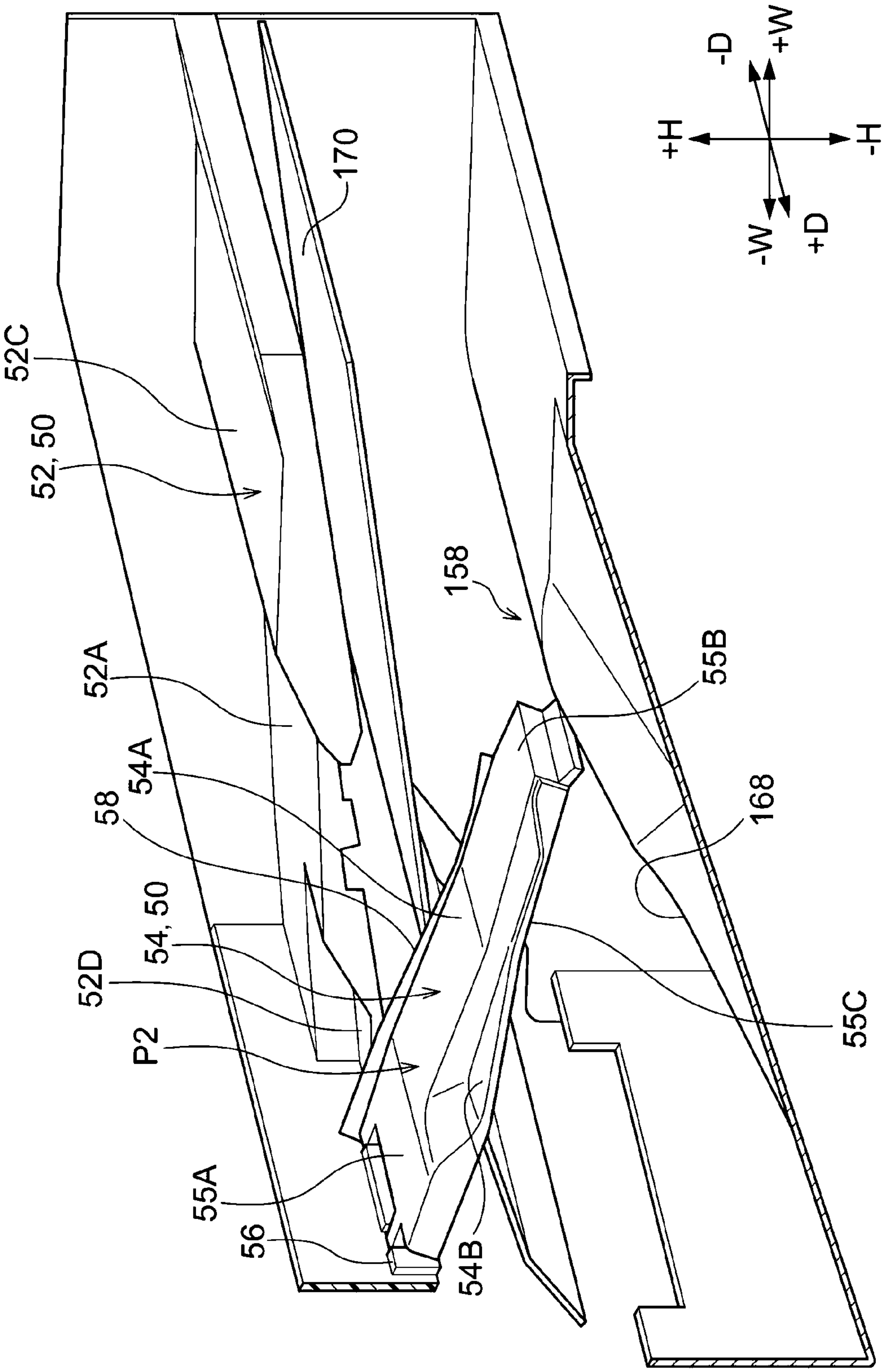
FIG. 5A is a perspective view illustrating a state where the rotating member has rotated to a descent position in the first output section of the image forming apparatus according to the first exemplary embodiment.
Figure 5B:
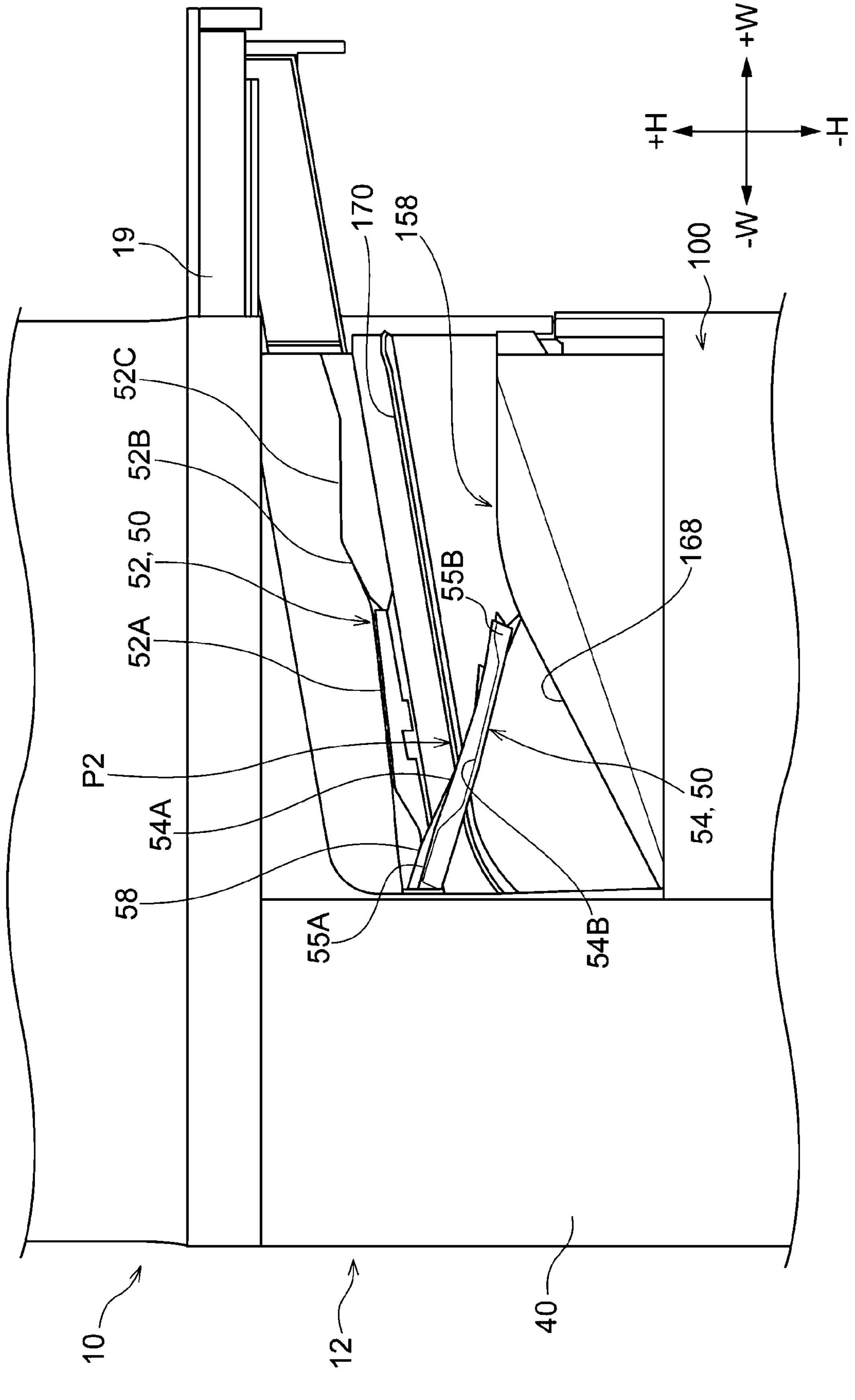
FIG. 5B is a front view illustrating a state where the rotating member has rotated to the descent position in the first output section of the image forming apparatus according to the first exemplary embodiment.

The document output section 50 is where a document G read by the document reading device 12 and transported in the width direction (i.e., W direction) of the image forming unit 100 is output. The width direction (i.e., W direction) of the image forming unit 100 extends parallel to the left-right direction of the image forming unit 100 in the front view of the image forming apparatus 10. As shown in FIGS. 2 and 4A, the document output section 50 is a support member (e.g., output tray) that supports the output document G. The document output section includes an output body 52 serving as a large portion of the document output section 50 and a rotating member 54 serving as a front (i.e., +D) portion of the document output section 50 in the depth direction (i.e., D direction) of the image forming unit 100 (see FIGS. 6 and 7). The rotating member 54 rotates to switch between an output position P1 (see FIGS. 4A and 4B) and a descent position P2 (see FIGS. 5A and 5B) to be described later.

The image forming apparatus 10 is also provided with a detector 62 (see FIG. 10) that detects the rotational position (i.e., rotational state) of the rotating member 54. Furthermore, the image forming apparatus 10 is provided with a locking device 70 that retains the rotating member 54 to prevent it from rotating from the output position P1. The locking device 70 is an example of a retainer.

Output Body 52

Figure 3:
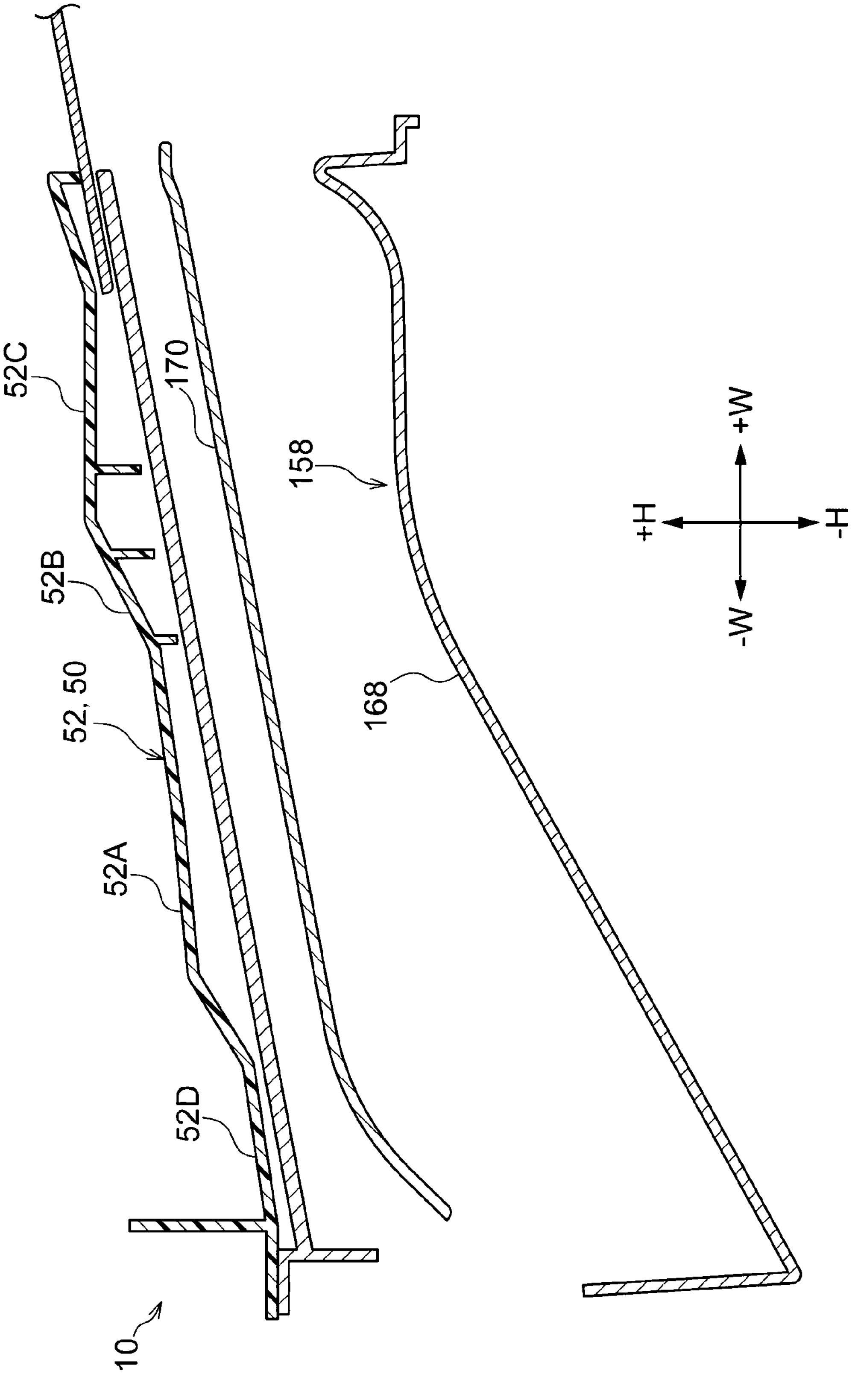
FIG. 3 is a cross-sectional view schematically illustrating the first output section, the second output section, and the vicinity thereof in the image forming apparatus according to the first exemplary embodiment.

As shown in FIGS. 2 to 7, the output body 52 is a large portion serving as a general part of the document output section 50. FIG. 3 is a cross-sectional view of the output body 52, taken in the apparatus width direction (i.e., W direction). The output body 52 is an output tray that is L-shaped in plan view (see FIGS. 6 and 7). In the front view of the image forming apparatus 10, the output body 52 is disposed to surround the rear side (i.e., −D side) of the rotating member 54 in the depth direction and the right side (i.e., +W side) of the rotating member 54 in the apparatus width direction. In the document reading device 12, a document G is transported in the width direction (i.e., W direction) of the image forming apparatus 10 so as to be output to the document output section 50. In the front view of the image forming apparatus 10, the right side (i.e., +W side) of the rotating member 54 in the apparatus width direction is the downstream side in the output direction of the document G. A rear (i.e., −D) portion of the output body 52 in the depth direction of the image forming apparatus 10 extends substantially along the entire length of the document output section 50 in the apparatus width direction (i.e., W direction). A front (i.e., +D) portion of the output body 52 in the depth direction of the image forming apparatus 10 is disposed downstream (sometimes referred to as "downstream in the output direction" hereinafter) relative to the rotating member 54 in the output direction of the document G.

Figure 6:
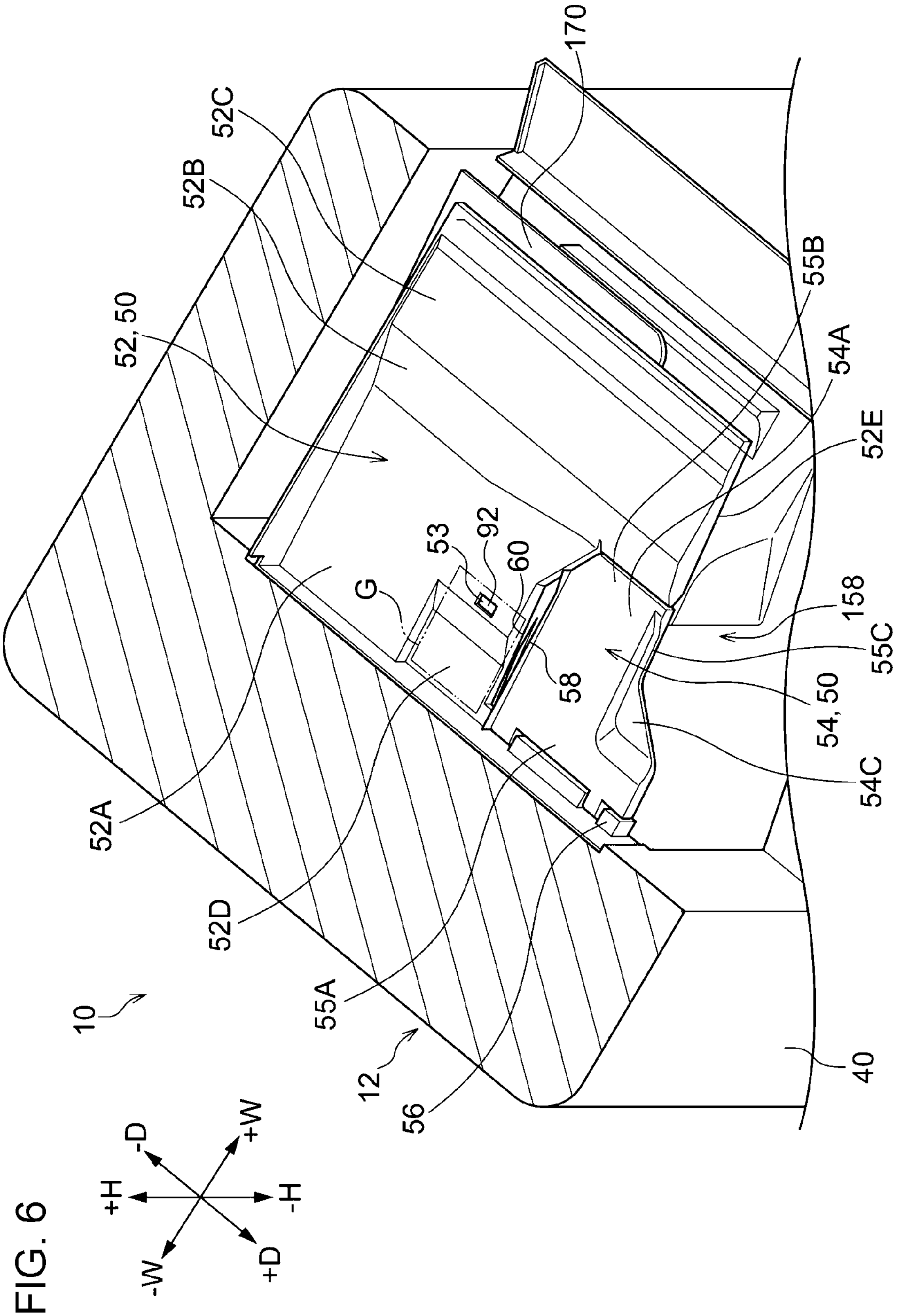
FIG. 6 is a perspective view illustrating the first output section of the image forming apparatus according to the first exemplary embodiment, as viewed from above.

As shown in FIG. 6, the output body 52 is disposed at a position including the center of the document output section 50 in the depth direction (i.e., D direction). For example, the document G is output to the document output section 50 in a state where the center of the document Gin the depth direction (i.e., D direction) is aligned with the center of the document output section 50 in the depth direction (i.e., D direction). The output body 52 has a top surface 52A that includes the rear side (i.e., −D side) of the document output section 50 in the depth direction and that is disposed upstream in the output direction of the document G, and also has a slope 52B inclined to increase in height downstream in the output direction of the document G from an end of the top surface 52A. The output body 52 also has an upper top surface 52C extending in the horizontal direction downstream in the output direction of the document G from an end of the slope 52B.

Furthermore, the output body 52 has a recess 52D that is provided at the center of the document output section 50 in the depth direction (i.e., D direction) and that is recessed from the top surface 52A. The recess 52D is provided in the output body 52 at the upstream side thereof in the output direction of the document G. With regard to the recess 52D, the rear side (i.e., −D side) thereof in the depth direction of the document output section 50 and the downstream side thereof in the output direction of the document G connect to the top surface 52A. In the recess 52D, a location adjacent to the top surface 52A is provided with a sloped surface that increases in height toward the top surface 52A. The recess 52D has a size set to accommodate a document G (e.g., a business card) smaller than an A4-size document. For example, in a case where a business card is output as a document G in the apparatus width direction (i.e., W direction) to the center of the document output section 50 in the depth direction (i.e., D direction), the business card is output into the recess 52D. In other words, a small-size document G is output toward the output body 52 at the rear side (i.e., −D side) of the document output section 50 in the depth direction. For example, in a case where a business card is output as a small-size document G to the document output section 50, the document G is not present at the front side (i.e., +D side) of the document output section 50 in the depth direction.

The output body 52 is composed of, for example, resin. In the first exemplary embodiment, the output body 52 is composed of an optically non-transmissive material and is colored. Alternatively, the output body 52 may be composed of an optically transmissive material.

Rotating Member 54

As shown in FIGS. 4A to 5B, the rotating member 54 is rotatable by a rotational supporter 56 disposed at the upstream side in the output direction of the document G. The rotational supporter 56 supports a rotating shaft 57 (see FIG. 12) of the rotating member 54 in a rotatable manner. Although not shown, the rotational supporter 56 is provided with a bearing therein, and the rotating shaft 57 of the rotating member 54 is supported by the bearing in a rotatable manner. The rotating shaft 57 is provided at an upstream end 55A of the rotating member 54 in the output direction of the document G. The rotating member 54 switches between the output position P1 (see FIGS. 4A and 4B) from which the document G is output and the descent position P2 (see FIGS. 5A and 5B) to which a downstream end 55B in the output direction descends relative to the output position P1. The end 55B of the rotating member 54 is an example of a downstream end in the output direction of the document G.

Although not shown, for example, the rotating member 54 is rotated between the output position P1 and the descent position P2 by actuating an actuator coupled to the rotating shaft 57. Alternatively, the rotating member 54 may be rotated between the output position P1 and the descent position P2 by rotating a motor coupled to the rotating shaft 57.

Figure 7:
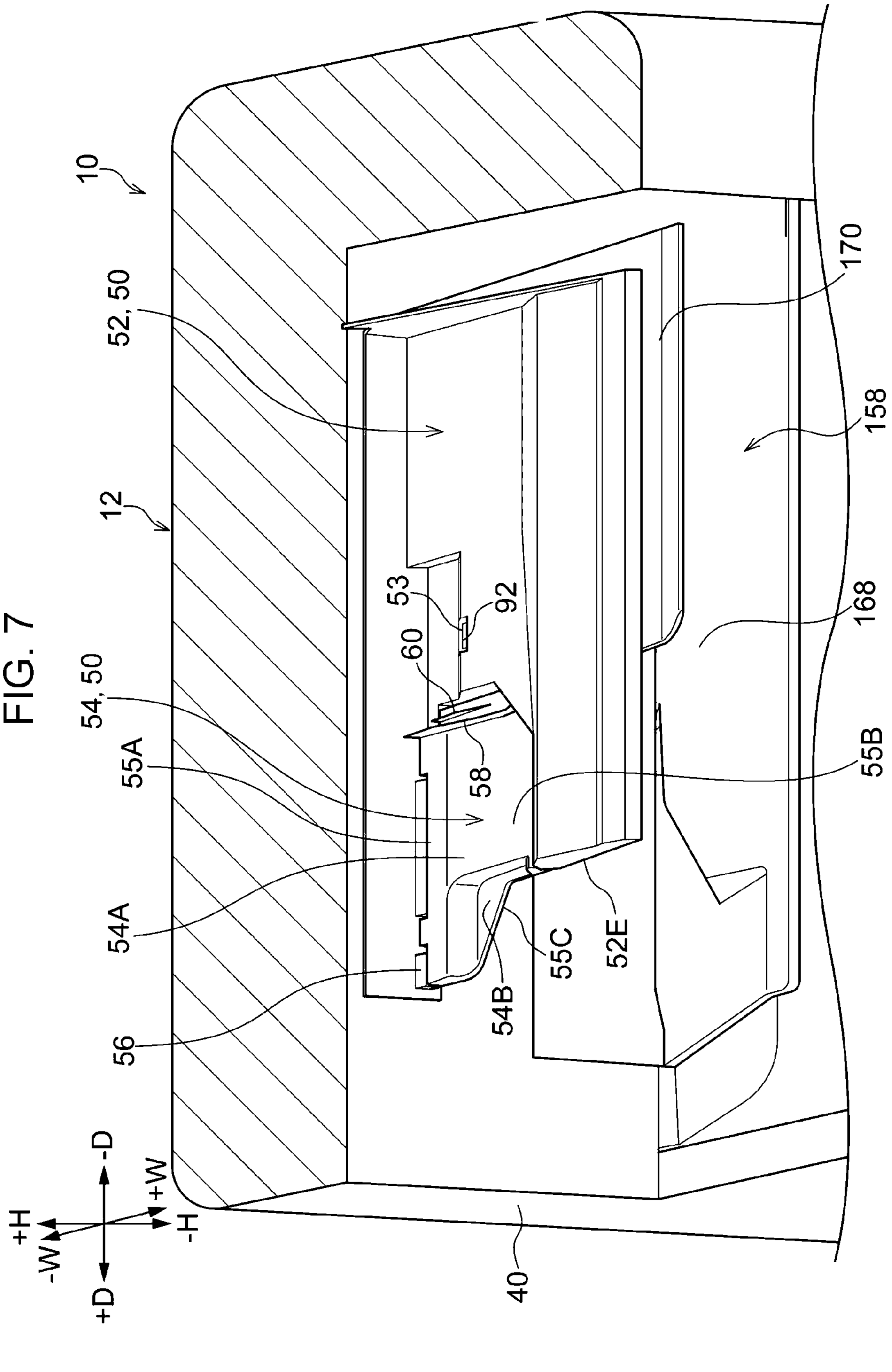
FIG. 7 is a perspective view illustrating the first output section of the image forming apparatus according to the first exemplary embodiment, as viewed from above from another direction.

As shown in FIGS. 6 and 7, the rotating member 54 serves as an upstream portion of the document output section 50 in the output direction of the document G. The range of the rotating member 54 serving as the aforementioned "portion" of the document output section 50 may be set in accordance with the length and the position of a small-size document G in the depth direction (i.e., D direction) in which the document G is loaded. In plan view, the rotating member 54 has a cutout 55C obtained by cutting out the downstream side (i.e., +W side) in the output direction of the document G relative to the upstream side (i.e., −W side) toward the rear side (i.e., −D side) of the image forming unit 100 in the depth direction.

The rotating member 54 has a top surface 54A serving as a large portion of the rotating member 54 and a recess 54B recessed from the top surface 54A in a region that is in contact with the cutout 55C. An area of the recess 54B that connects to the top surface 54A is provided with a sloped surface inclined to decrease in height from the top surface 54A. A front (i.e., +D) edge 52E of the output body 52 in the depth direction extends along an extension of the cutout of the rotating member 54 toward the +W side in the apparatus width direction (i.e., W direction). In plan view, the document output section 50 is given a cutout shape by the cutout of the rotating member 54 and the edge 52E of the output body 52 such that the downstream side (i.e., +W side) in the output direction of the document G is cut out relative to the upstream side (i.e., −W side) toward the rear side (i.e., −D side) of the image forming unit 100 in the depth direction (see FIGS. 6 and 7).

Figure 9:
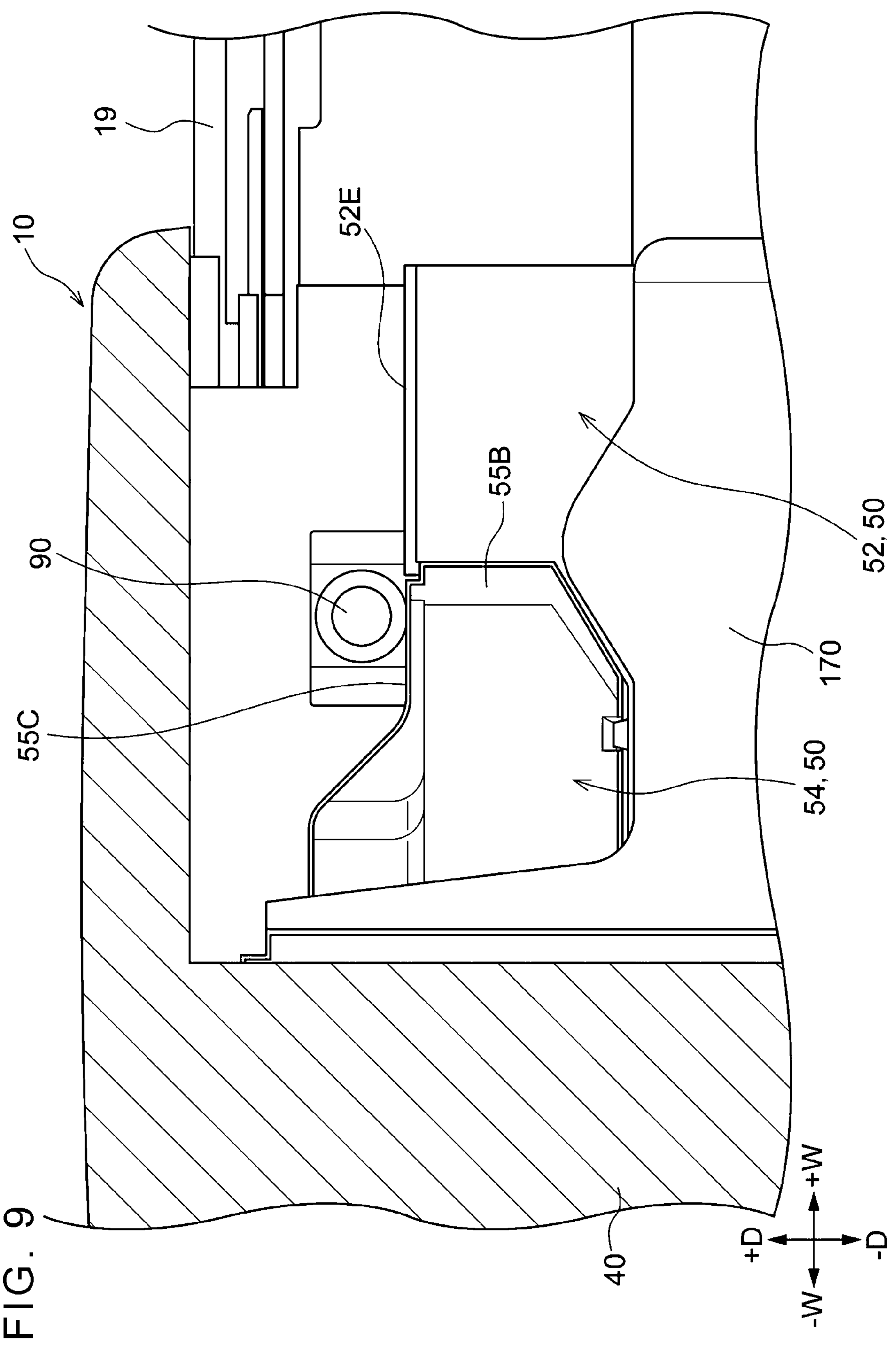
FIG. 9 is a perspective view illustrating the first output section of the image forming apparatus according to the first exemplary embodiment, as viewed from the rear side from another direction.

FIG. 8 illustrates the configuration of the document output section 50 and the sheet guide 170, as viewed upward from below. FIG. 9 is a bottom view of the document output section 50 and the sheet guide 170, as viewed from below. As shown in FIGS. 8 and 9, the rotating member 54 and the sheet guide 170 have shapes such that they do not overlap each other in the up-down direction. In other words, this configuration may be such that the sheet guide 170 is not present below (i.e., at the −H side of) of the rotating member 54.

For example, an upstream portion of the sheet guide 170 in the output direction of the recording paper P is disposed substantially along the entire length of the sheet output section 158 in the depth direction (i.e., D direction), whereas a downstream portion of the sheet guide 170 in the output direction of the recording paper P is cut out at the front side (i.e., +D side) in the depth direction (i.e., D direction) of the sheet output section 158. Accordingly, the rotating member 54 and the sheet guide 170 hardly overlap each other in the up-down direction. In the first exemplary embodiment, the upstream (i.e., +D) portion of the rotating member 54 in the output direction of the document G slightly overlaps the sheet guide 170 in the up-down direction. However, when the rotating member 54 rotates to the descent position P2, the rotating member 54 does not come into contact with (i.e., does not interfere with) the sheet guide 170.

The color of the rotating member 54 is different from the color of the output body 52 serving as another portion of the document output section 50. For example, the rotating member 54 is composed of resin and is given a predetermined color different from the color of the output body 52 or is transparent. In the first exemplary embodiment, the rotating member 54 is composed of a material capable of transmitting light from the lighting unit 90 and is, for example, transparent or translucent.

The top surface 54A of the rotating member 54 is adjacent to the recess 52D and the top surface 52A of the output body 52 from the upstream side (i.e., −W side) toward the downstream side (i.e., +W side) in the output direction of the document G. The height of the top surface 54A of the rotating member 54 may be substantially equal to the height of the recess 52D of the output body 52.

As shown in FIGS. 6 and 7, the rotating member 54 includes a protrusion 58 that supports a lateral side of a document G when the output document G is smaller than an A4-size document. The protrusion 58 protrudes upward (i.e., toward the +H side) in the up-down direction from the top surface 54A. The top surface 54A is an example of an upper surface of the rotating member 54. The protrusion 58 is provided at an edge of the rotating member 54 located toward the output body 52 and extends in the output direction (i.e., W direction) of the document G.

The protruding height of the protrusion 58 from the top surface 54A of the rotating member 54 is lower at the downstream side (i.e., +W side) than at the upstream side (i.e., −W side) in the output direction of the document G. For example, the protrusion 58 is provided such that the protruding height thereof from the top surface 54A gradually decreases downstream from an intermediate location in the output direction of the document G. As an alternative to the first exemplary embodiment in which the downstream end of the protrusion 58 in the output direction of the document G protrudes slightly upward, the downstream end of the protrusion 58 does not have to protrude upward.

The rotating member 54 is provided with a rib 60 that is located at the rear side (i.e., −D side) in the depth direction relative to the protrusion 58 and that has a protruding height smaller than that of the protrusion 58. The rib 60 is disposed along the protrusion 58 with a distance from the protrusion 58. The rib 60 may have a height lower than that of the top surface 52A of the output body 52. The rib 60 is provided in a range smaller than the range in which the protrusion 58 is provided in the output direction of the document G. For example, in a direction parallel to the output direction of the document G, the rib 60 has a length set to about half of the length of the protrusion 58.

Detector 62

Figure 10:
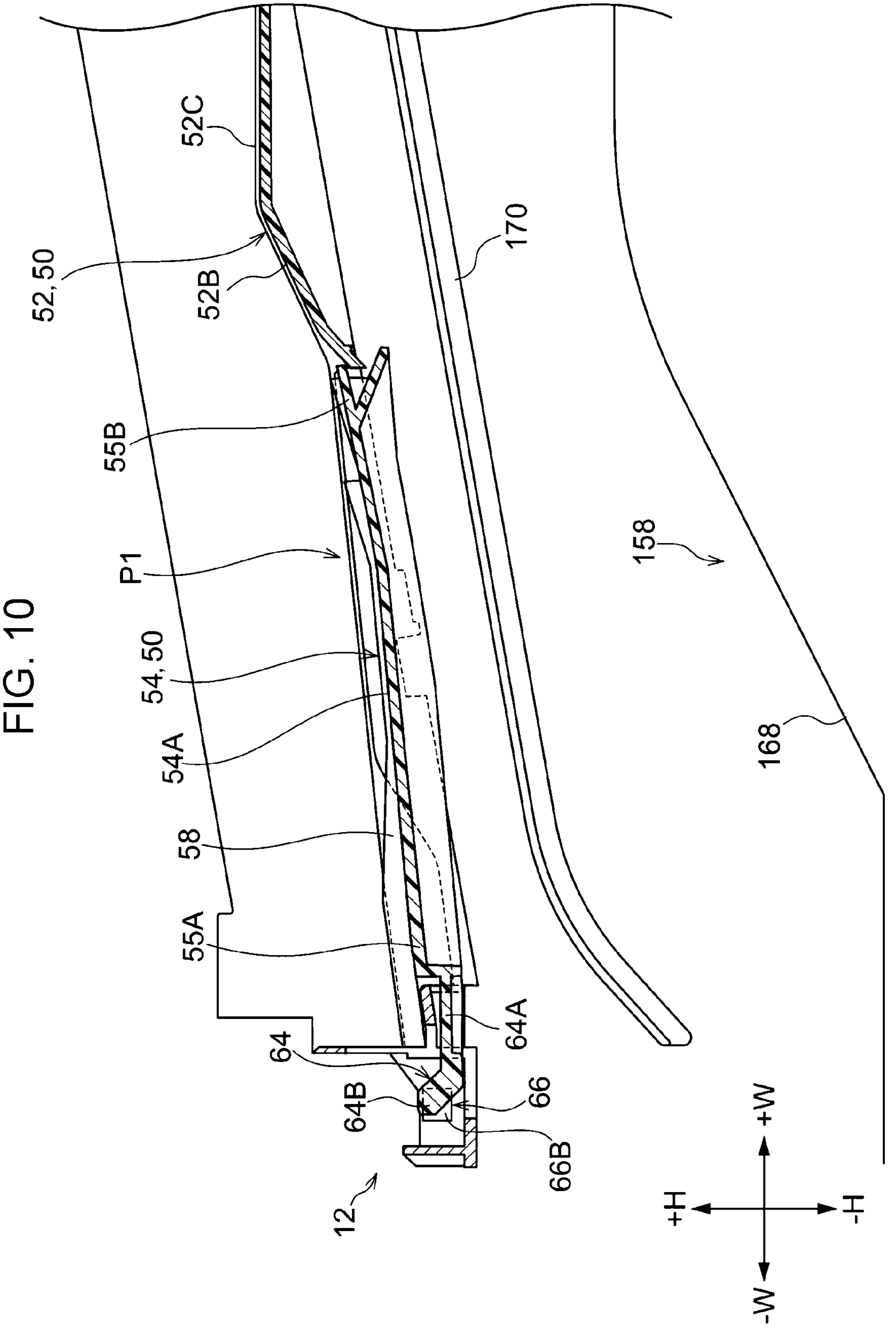
FIG. 10 is a cross-sectional view illustrating the first output section and an open-close detection sensor for the rotating member in the image forming apparatus according to the first exemplary embodiment and showing a state where the rotating member has rotated to the output position.
Figure 11:
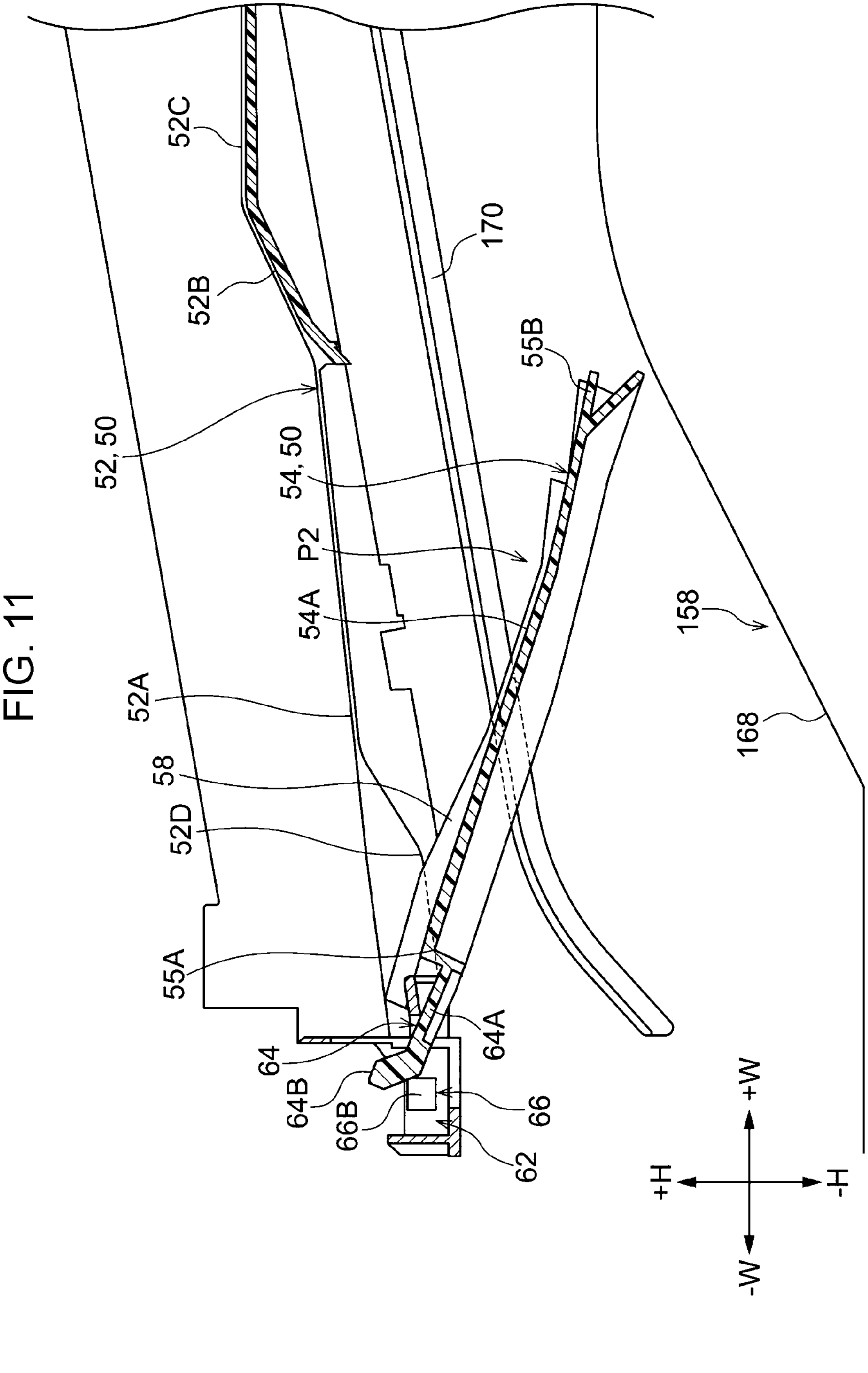
FIG. 11 is a cross-sectional view illustrating the first output section and the open-close detection sensor for the rotating member in the image forming apparatus according to the first exemplary embodiment and showing a state where the rotating member has rotated to the descent position.

As shown in FIGS. 10 and 11, the detector 62 has a function for detecting the rotational position (i.e., rotational state) of the rotating member 54, as mentioned above. The rotating member 54 is provided with an extension portion 64 extending from the upstream end of the rotating member 54 in the output direction of the document G toward the interior of the document reading device 12, that is, toward the −W side of the image forming apparatus 10 in the width direction (i.e., W direction). The extension portion 64 is formed of a plate-like member.

More specifically, the extension portion 64 includes a strip-like piece 64A extending in the horizontal direction from the lower side of the upstream end 55A of the rotating member 54 in the output direction of the document G, and also includes a protrusion piece 64B extending from an end of the strip-like piece 64A toward the −W side in the apparatus width direction (i.e., W direction) and toward a diagonally upper side (i.e., +H side). The detector 62 includes a sensor 66 disposed at a position facing the protrusion piece 64B in the depth direction (i.e., D direction) in a state where the rotating member 54 has rotated to the output position P1 (see FIG. 10). The sensor 66 includes a light emitter (not shown) disposed at one side of the protrusion piece 64B and a light receiver 66B disposed at the other side of the protrusion piece 64B. The sensor 66 detects the rotational state of the rotating member 54 based on whether or not light emitted by the light emitter is detected by the light receiver 66B.

As shown in FIG. 10, in the state where the rotating member 54 has rotated to the output position P1, the protrusion piece 64B is located between the light emitter (not shown) and the light receiver 66B of the sensor 66. In this state, the light emitted from the light emitter is blocked by the protrusion piece 64B and is thus not received by the light receiver 66B.

As shown in FIG. 11, in a state where the rotating member 54 has rotated to the descent position P2, the protrusion piece 64B has shifted upward away from the position between the light emitter (not shown) and the light receiver 66B of the sensor 66. In this state, the light emitted from the light emitter is received by the light receiver 66B without being blocked by the protrusion piece 64B. Accordingly, the detector 62 is capable of detecting whether the rotating member 54 has rotated to the output position P1 or the descent position P2. A signal detected by the detector 62 is transmitted to the controller 180.

Locking Device 70

Figure 12:
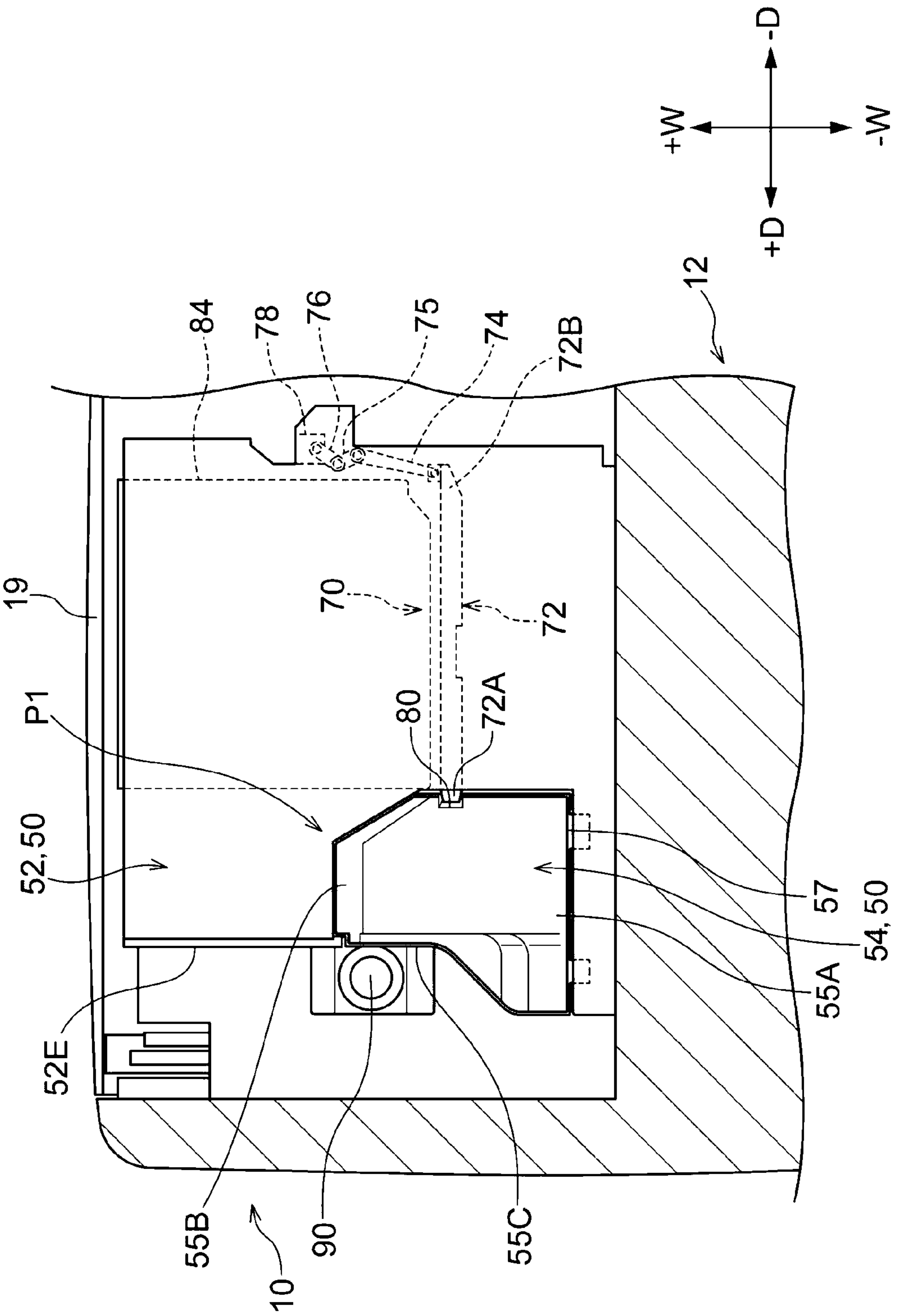
FIG. 12 is a plan view illustrating a locking device for the rotating member in the image forming apparatus according to the first exemplary embodiment and showing a state where the rotating member is locked.
Figure 13:
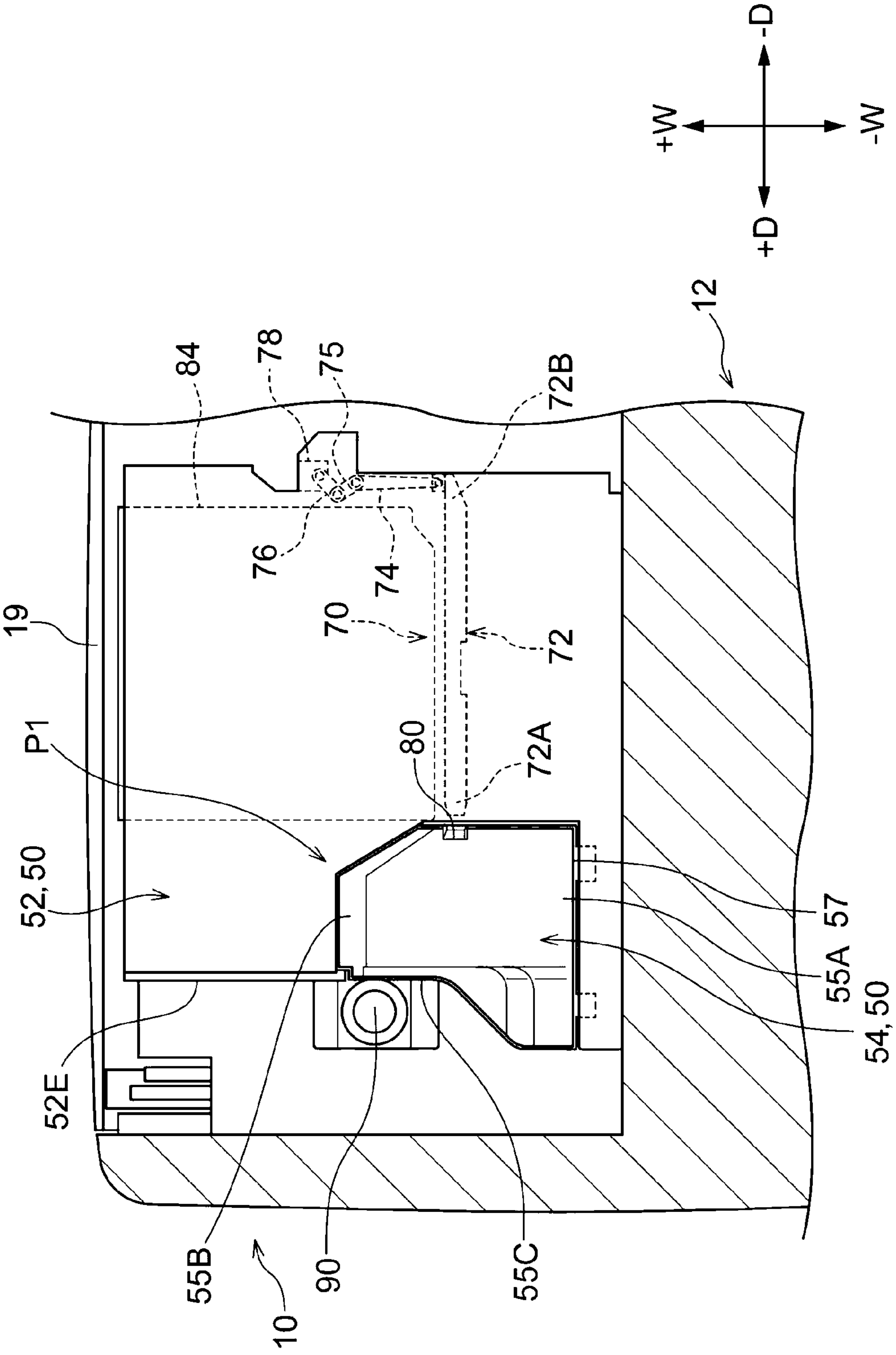
FIG. 13 is a plan view illustrating the locking device for the rotating member in the image forming apparatus according to the first exemplary embodiment and showing a state where the rotating member is unlocked.

As shown in FIGS. 12 and 13, the locking device 70 has a function for retaining (i.e., locking) the rotating member 54 to prevent it from rotating from the output position P1 (see FIG. 10) when the image forming unit 100 forms an image onto recording paper P. For example, in the image forming apparatus 10, when the controller 180 actuates the image forming unit 100, if the detector 62 detects that the rotating member 54 has rotated to the output position P1 (see FIG. 10), the locking device 70 locks the rotating member 54 to prevent it from rotating. For example, a print permission condition may be set such that the image forming apparatus 10 locks the rotating member 54 in the output position P1 to prevent it from rotating therefrom. A print prohibition condition may be set such that the image forming apparatus 10 unlocks the rotating member 54 (i.e., set the rotating member 54 in a rotatable state).

As shown in FIGS. 12 and 13, the locking device 70 includes a locking section 72 that locks the rotating member 54 to prevent it from rotating, as well as a first link member 74, a second link member 75, and a third link member 76 as multiple (three in the first exemplary embodiment) link members that cause the locking section 72 to operate. Moreover, the locking device 70 includes a solenoid 78 as a driver that actuates the locking section 72 via the first link member 74, the second link member 75, and the third link member 76.

As shown in FIG. 12, the locking section 72 is formed of a rod-like member. For example, the locking section 72 is disposed in the depth direction (i.e., D direction). The rotating member 54 is provided with a recess 80 engageable with a first longitudinal end 72A of the locking section 72. The recess 80 is provided at a rear (i.e., –D) edge of the rotating member 54 in the depth direction and is located away from the rotating shaft 57. In the state where the rotating member 54 has rotated to the output position P1, the first end 72A of the locking section 72 engages with the recess 80 of the rotating member 54, so that the rotating member 54 is locked and is prevented from rotating.

A second longitudinal end 72B of the locking section 72 is coupled to a first longitudinal end of the first link member 74 in a rotatable manner, and a second longitudinal end of the first link member 74 is coupled to a first longitudinal end of the second link member 75 in a rotatable manner. A second longitudinal end of the second link member 75 is coupled to a first longitudinal end of the third link member 76 in a rotatable manner. A second longitudinal end of the third link member 76 is provided with a rotating shaft, and the solenoid 78 rotates the rotating shaft of the third link member 76.

As shown in FIG. 13, the solenoid 78 rotates the rotating shaft of the third link member 76, thereby actuating the second link member 75 and the third link member 76 and moving the first end 72A of the locking section 72 away from the recess 80 of the rotating member 54 (i.e., toward the rear side (–D side) in the depth direction in the first exemplary embodiment). Accordingly, the rotating member 54 is unlocked by the locking section 72, whereby the rotating member 54 becomes rotatable.

Lighting Unit 90

As shown in the bottom views of FIGS. 8, 9, 12, and 13, the lighting unit 90 is provided at a position that is located at the front side (i.e., +D side) of the cutout 55C of the rotating member 54 in the depth direction and where the lighting unit 90 does not overlap the document output section 50 in the up-down direction (i.e., H direction) (see FIG. 8). In the first exemplary embodiment, a single lighting unit 90 is provided. For example, the lighting unit 90 includes a circular light emitter. The lighting unit 90 is constituted of, for example, a light-emitting diode (LED). For example, the lighting unit 90 is inclined with the rear side thereof being higher than the front side thereof so as to illuminate the rear side (i.e., –D side) of the document output section 50 in the depth direction.

As shown in FIGS. 6 and 7, an opening 53 is provided near the recess 52D in the top surface 52A of the output body 52, and a sensor 92 that detects that there is a document Gin the document output section 50 is provided within the opening 53. For example, the sensor 92 is provided at the center of the document output section 50 in the depth direction (i.e., D direction). For example, the sensor 92 includes a light receiver that detects light. When a document G is output to the document output section 50, the upper side of the sensor 92 is blocked by the document G, so that the amount of light received decreases. Accordingly, the sensor 92 detects that the document G is in the document output section 50. A detection signal of the document G obtained by the sensor 92 is transmitted to the controller 180.

When the sensor 92 detects that the document G is in the document output section 50, the controller 180 causes the lighting unit 90 to emit light. Accordingly, the document G output to the document output section 50 is illuminated by the lighting unit 90. For example, the image forming apparatus 10 is capable of informing the user that the document G is in the document output section 50 by causing the lighting unit 90 to emit light.

As mentioned above, the rotating member 54 is composed of a material capable transmitting the light from the lighting unit 90. For example, in a state where there is no document G on the rotating member 54, the light from the lighting unit 90 is transmitted through the rotating member 54 and is radiated onto the sheet output section 158 below (i.e., at the –H side of) the rotating member 54 in the up-down direction. The image forming apparatus 10 is provided with a sensor (not shown) that detects that there is recording paper P in the sheet output section 158. When the sensor detects that there is recording paper P in the sheet output section 158, the image forming apparatus 10 causes the lighting unit 90 to emit light. Accordingly, the image forming apparatus 10 is capable of informing the user that the recording paper P is in the sheet output section 158 by causing the lighting unit 90 to emit light.

Output Extension Tray 84

As shown in FIG. 12, the document output section 50 is provided with an output extension tray 84 at a position where it overlaps the output body 52. For example, the output extension tray 84 is rectangular in bottom view. The output extension tray 84 is provided at the downstream side (+W side) of the output body 52 in the output direction of the document G and at the rear side (i.e., –D side) of the output body 52 in the depth direction. The output extension tray 84 is configured to be drawn downstream in the output direction of the document G relative to the output body 52 by a guide member (not shown) (see FIG. 14).

For example, the output extension tray 84 is accommodated below the output body 52. For example, in a state where the output extension tray 84 is drawn downstream in the output direction of the document G relative to the output body 52, the height at the top surface of the output extension tray 84 is slightly lower than the height at the upper top surface 52C of the output body 52. A step between the top surface of the output extension tray 84 and the upper top surface 52C of the output body 52 is given dimensions such as not to become a hindrance to supporting the document G when the document G is output.

Figure 14:
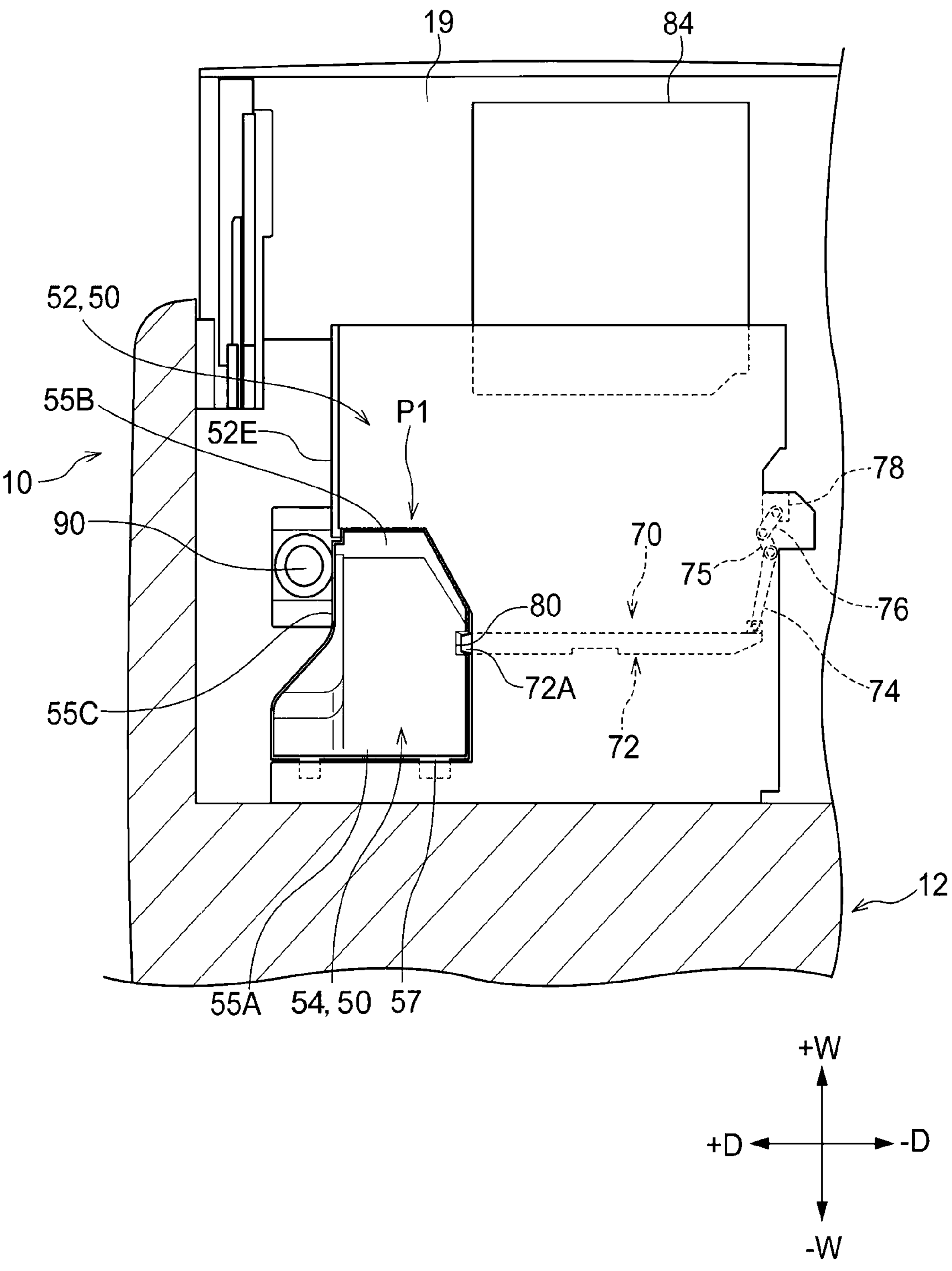
FIG. 14 schematically illustrates a flat plate and an output extension tray in an exposed state in the image forming apparatus according to the first exemplary embodiment, as viewed from the rear side of the first output section.

As shown in FIG. 14, in the image forming apparatus 10, the flat plate 19 of the document tray 18 is movable toward the right side (i.e., +W side) in the apparatus width direction (see FIG. 2). For example, in the image forming apparatus 10, when the flat plate 19 of the document tray 18 is drawn toward the +W side in the apparatus width direction, the output extension tray 84 is also drawn toward the +W side in the apparatus width direction, that is, downstream in the output direction of the document G, relative to the output body 52.

Operation and Effects of First Exemplary Embodiment

The operation and the effects of the first exemplary embodiment will now be described.

The image forming apparatus 10 according to the first exemplary embodiment is provided with the image forming unit 100 and the document reading device 12 disposed above (i.e., at the +H side of) the image forming unit 100 in the up-down direction (see FIG. 1). Furthermore, in the image forming apparatus 10, the connection section 40 that connects the image forming unit 100 and the document reading device 12 to each other in the up-down direction is provided with the document output section 50 to which the document G is output (see FIG. 2). The document G read by the document reading device 12 and transported in the width direction (i.e., W direction) of the image forming unit 100 is output to the document output section 50 (see FIG. 1).

In the image forming apparatus 10, the connection section 40 is provided with the sheet output section 158 below (i.e., at the −H side of) the document output section 50 (see FIG. 2). Recording paper P having an image formed thereon by the image forming unit 100 is output to the sheet output section 158 (see FIG. 1).

The document output section 50 includes the output body 52 and the rotating member 54 serving as the front (i.e., +D) portion of the document output section 50 in the depth direction of the image forming unit 100 (see FIG. 2). The rotating member 54 is rotatable by the rotating shaft 57 (see FIG. 12) disposed at the upstream side (i.e., −W side) in the output direction of the document G. The rotating member 54 switches between the output position P1 (see FIGS. 4A and 4B) from which the document G is output and the descent position P2 (see FIGS. 5A and 5B) to which the downstream end 55B of the rotating member 54 in the output direction descends relative to the output position P1.

In the image forming apparatus 10, in a state where the rotating member 54 has rotated to the output position P1, the document reading device 12 transports the document G, reads an image from the document G, and outputs the document G to the document output section 50. For example, in a case where the document G is an A4-size document (including a case where the longitudinal direction of the document G is parallel to the output direction), the document G is output to a region extending astride an upper portion of the output body 52 and an upper portion of the rotating member 54 in the document output section 50. However, in a case where the document G is a small-size document smaller than an A4-size document, the document G is output to a region of the upper portion of the output body 52 such that the document G is output to a smaller region of the upper portion of the rotating member 54 in the document output section 50. In a case where the document G is a business card as an example of a small-size document G, the document G is output to the region of the upper portion of the output body 52 but is not output to the upper portion of the rotating member 54 in the document output section 50. Specifically, in the case where the document G is, for example, a business card, the document G is output to the output body 52 at the rear side (i.e., −D side) of the document output section in the depth direction but is absent on the rotating member 54 at the front side (i.e., +D side) in the depth direction.

In the case where the document G is a small-size document, as mentioned above, the image forming apparatus 10 rotates the rotating member 54 to the descent position P2 when the document G output to the document output section 50 is to be unloaded. Since the rotating member 54 serves as the front (i.e., +D) portion of the document output section 50 in the depth direction of the image forming unit 100, rotating the rotating member 54 to the descent position P2 facilitates the accessibility of the small-size document G for the user, thereby achieving enhanced ease of unloading of the small-size document G.

In the image forming apparatus 10 according to the first exemplary embodiment, the process for rotating the rotating member 54 to the descent position P2 involves the user manually pressing down on the rotating member 54 to rotate the rotating member 54 to the descent position P2. Alternatively, the user may press an operation button to cause a moving device, such as a motor or a solenoid, to rotate the rotating member 54 to the descent position P2. As another alternative, in a case where a sensor detects the size of the document G and determines that the size of the document G is smaller than or equal to a predetermined size (i.e., a predetermined size smaller than A4 size), the moving device, such as a motor or a solenoid, may be caused to rotate the rotating member 54 to the descent position P2.

Accordingly, the image forming apparatus 10 may achieve enhanced ease of unloading of the small-size document G, as compared with a configuration where a portion of the output section to which the document is output and that is disposed at the front side (i.e., +D side) of the image forming unit in the depth direction is rotated by the rotating shaft extending in the width direction of the image forming unit. In other words, the image forming apparatus 10 may achieve enhanced ease of unloading of the small-size document G, as compared with a configuration where the front portion, in the depth direction, of the output section to which the document is to be output is rotated by the rotating shaft extending in the width direction of the image forming unit.

Furthermore, the image forming apparatus 10 is provided with the sheet guide 170 above the sheet output section 158 and below the document output section 50. The sheet guide 170 supports the recording paper P to be inverted when the image forming unit 100 forms images onto both faces of the recording paper P. Moreover, the sheet guide 170 is not provided below the rotating member 54.

Accordingly, in the image forming apparatus 10, interference of the rotating member 54 with the sheet guide 170 may be suppressed when the rotating member 54 rotates downward relative to the output body 52 of the document output section 50, as compared with a configuration where the sheet guide 170 is provided below the rotating member 54.

Furthermore, in the image forming apparatus 10, the rotating member 54 serves as the upstream portion of the document output section 50 in the output direction of the document G.

Accordingly, the image forming apparatus 10 may facilitate application of force to the rotating member 54 to readily rotate the rotating member 54 downward, as compared with a case where the rotating member extends entirely in the document output direction. For example, the user may press down on the rotating member 54 to readily rotate the rotating member 54 to the descent position P2.

Furthermore, the image forming apparatus 10 is provided with the locking device 70 that retains the rotating member 54 to prevent it from rotating from the output position P1 when the image forming unit 100 is to form an image onto the recording paper P. For example, when the controller 180 actuates the image forming unit 100, the locking device 70 locks the rotating member 54 to prevent the rotating member 54 from rotating from the output position P1.

Accordingly, in the image forming apparatus 10, interference of the recording paper P with the rotating member 54 may be suppressed when the recording paper P is transported from the image forming unit 100 to the sheet output section 158 or the sheet guide 170, as compared with a case where the rotating member is rotatable from the output position when an image is to be formed on the recording paper.

Furthermore, the image forming apparatus 10 is provided with the lighting unit 90 that emits light when there is a document G output to the document output section 50 or recording paper P output to the sheet output section 158. The rotating member 54 is capable of transmitting the light from the lighting unit 90. Accordingly, when the lighting unit 90 emits the light, the light from the lighting unit 90 is transmitted through the rotating member 54, thereby illuminating the recording paper P in the sheet output section 158 disposed below the rotating member 54.

Accordingly, in the image forming apparatus 10, the number of lighting units 90 may be reduced, as compared with a configuration where the rotating member does not transmit the light from the lighting unit. For example, a lighting unit does not have to be provided above each of the document output section and the sheet output section.

Furthermore, in the image forming apparatus 10, the color of the rotating member 54 is different from the color of the document output section 50.

Accordingly, in the image forming apparatus 10, the position of the rotating member 54 to be rotated to the descent position P2 may be readily recognizable, as compared with a case where the rotating member and other parts (e.g., the output body) of the document output section have similar colors. Thus, the user may readily visually recognize the rotating member 54, thereby facilitating the rotation of the rotating member 54 to the descent position P2.

Furthermore, in plan view, the downstream side, in the output direction of the document G, of the document output section 50 in the image forming apparatus 10 is cut out relative to the upstream side toward the rear side (i.e., −D side) of the image forming unit 100 in the depth direction. In the first exemplary embodiment, the document output section 50 in plan view is given a cutout shape by the cutout 55C of the rotating member 54 and the edge 52E of the output body 52 such that the downstream side in the output direction of the document G is cut out relative to the upstream side toward the rear side (i.e., −D side) in the depth direction. Thus, when a large-size document G larger than or equal to an A4-size document is output to the document output section 50, an upstream portion thereof in the output direction of the document G may sometimes be positioned in the cutout area of the document output section 50.

Accordingly, the image forming apparatus 10 may achieve enhanced ease of unloading of a large-size document G larger than or equal to an A4-size document, as compared with a case where the edge of the document output section extends linearly in the document output direction.

Furthermore, in the image forming apparatus 10, the rotating member 54 in plan view has the cutout 55C obtained by cutting out the downstream side in the output direction of the document G relative to the upstream side toward the rear side (i.e., −D side) of the image forming unit 100 in the depth direction. Thus, when a large-size document G larger than or equal to an A4-size document is output to the document output section 50, an upstream portion thereof in the output direction of the document G may sometimes be positioned in the cutout 55C of the rotating member 54.

Accordingly, the image forming apparatus 10 may achieve enhanced ease of unloading of a large-size document G larger than or equal to an A4-size document, as compared with a case where the edge of the rotating member extends linearly in the document output direction.

Furthermore, in the image forming apparatus 10, the rotating member 54 includes the protrusion 58 that supports a lateral side of the document G when the output document G is smaller than an A4-size document.

Accordingly, the image forming apparatus 10 may suppress deviation of an output position of the document G (i.e., an output position on the document output section 50) when the document G output to the document output section 50 is smaller than an A4-size document, as compared with a case where the rotating member has a flat surface.

Furthermore, in the image forming apparatus 10, the protruding height of the protrusion 58 from the top surface 54A of the rotating member 54 is lower at the downstream side than at the upstream side in the output direction of the document G (i.e., the +W side is lower than the −W side in the width direction of the image forming apparatus 10 in the first exemplary embodiment).

Accordingly, in the image forming apparatus 10, the upper end of the protrusion 58 may readily retract from the output path of the document G when the rotating member 54 is rotated downward, as compared with a case where the protruding height of the protrusion from the top surface of the rotating member is uniform in the document output direction. Accordingly, a situation where the protrusion 58 becomes a hindrance may be suppressed when the document G on the document output section 50 is to be unloaded in a state where the rotating member 54 has rotated to the descent position P2.

Alternatives

Exemplary embodiments of the present disclosure are not limited to the exemplary embodiment described above, and may permit design modifications, as appropriate, so long as they do not depart from the scope of an exemplary embodiment of the present disclosure.

In the first exemplary embodiment, the color and the material of the rotating member 54 are changeable, and the color and the material of the output body 52 are also changeable. Moreover, the output body 52 may be composed of a material capable of transmitting light from the lighting unit 90.

As an alternative to the image forming apparatus 10 according to the first exemplary embodiment in which a single lighting unit 90 is provided, the position and the number of lighting units 90 are changeable.

As an alternative to the image forming apparatus 10 according to the first exemplary embodiment in which the rotating member 54 serves as the upstream portion of the document output section 50 in the output direction of the document G, for example, the rotating member 54 may be provided substantially along the entire length of the document output section 50 in the output direction of the document G. Furthermore, the shape of the rotating member 54 is also changeable so long as it does not depart from the scope of an exemplary embodiment of the present disclosure. As an alternative to the first exemplary embodiment in which the downstream side of the rotating member 54 in the output direction of the document G is cut out relative to the upstream side toward the rear side in the depth direction, for example, the rotating member 54 does not have to be cut out.

In the image forming apparatus 10 according to the first exemplary embodiment, the shape of the document output section 50 is also changeable so long as it does not depart from the scope of an exemplary embodiment of the present disclosure. As an alternative to the first exemplary embodiment in which the downstream side of the document output section 50 in the output direction of the document G is cut out relative to the upstream side toward the rear side in the depth direction, for example, the document output section 50 does not have to be cut out.

As an alternative to the image forming apparatus 10 according to the first exemplary embodiment in which the sheet guide 170 is provided as a duplex supporter that supports the recording paper P to be inverted when images are to be formed on both faces of the recording paper P, for example, the image forming apparatus 10 may be configured not to include a duplex supporter.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

an image forming unit that forms an image onto a recording medium;

an image reading unit that is disposed above the image forming unit in an up-down direction, transports a document, and reads an image formed on the document;

a first output section that is provided in a connection section connecting the image forming unit and the image reading unit to each other in the up-down direction and to which the document read by the image reading unit and transported in a width direction of the image forming unit is output;

a second output section that is provided below the first output section in the connection section and to which the recording medium having the image formed thereon by the image forming unit is output; and a rotating member that serves as a front portion of the first output section in a depth direction of the image forming unit, is rotatable by a rotating shaft disposed at an upstream side in an output direction of the document, and switches between an output position from which the document is output and a descent position to which a downstream end of the rotating member in the output direction descends relative to the output position.

(((2)))

The image forming apparatus according to (((1))), further comprising:

a supporter that is provided above the second output section and below the first output section and that supports the recording medium to be inverted when the image forming unit forms images onto both faces of the recording medium, wherein the supporter is not present below the rotating member.

(((3)))

The image forming apparatus according to (((1))) or (((2))), wherein the rotating member serves as an upstream portion of the first output section in the output direction of the document.

(((4)))

The image forming apparatus according to any one of (((1))) to (((3))), further comprising a retainer that retains the rotating member to prevent the rotating member from rotating from the output position when the image forming unit forms the image onto the recording medium.

(((5)))

The image forming apparatus according to any one of (((1))) to (((4))), further comprising:

a lighting unit that emits light when the document output to the first output section or the recording medium output to the second output section is present, wherein the rotating member is capable of transmitting the light from the lighting unit.

(((6)))

The image forming apparatus according to any one of (((1))) to (((5))), wherein the rotating member has a color different from a color of another portion of the first output section.

(((7)))

The image forming apparatus according to any one of (((1))) to (((6))), wherein the first output section in plan view has a shape in which a downstream side thereof in the output direction of the document is cut out relative to an upstream side thereof toward a rear side of the image forming unit in the depth direction.

(((8)))

The image forming apparatus according to (((7))), wherein, in plan view, a downstream side of the rotating member in the output direction of the document is cut out relative to an upstream side thereof toward the rear side of the image forming unit in the depth direction.

(((9)))

The image forming apparatus according to any one of (((1))) to (((8))), wherein the rotating member includes a protrusion that supports a lateral side of the document when the output document is smaller than an A4-size document.

(((10)))

The image forming apparatus according to (((9))), wherein a protruding height of the protrusion from an upper surface of the rotating member is lower at a downstream side thereof in the output direction of the document than at an upstream side thereof

What is claimed is:

1. An image forming apparatus comprising:

an image forming unit that forms an image onto a recording medium;

an image reading unit that is disposed above the image forming unit in an up-down direction, transports a document, and reads an image formed on the document;

a first output section that is provided in a connection section connecting the image forming unit and the image reading unit to each other in the up-down direction and to which the document read by the image reading unit and transported in a width direction of the image forming unit is output;

a second output section that is provided below the first output section in the connection section and to which the recording medium having the image formed thereon by the image forming unit is output; and a rotating member that serves as a front portion of the first output section in a depth direction of the image forming unit, is rotatable by a rotating shaft disposed at an upstream side in an output direction of the document, and switches between an output position and another output position to output the document, wherein the another output position is a descent position to which a downstream end of the rotating member in the output direction descends relative to the output position, wherein in a case where a size of the document is greater than or equal to a predetermined size, the rotating member switches to the output position to output the document, and wherein in a case where the size of the document is less than the predetermined size, the rotating member switches to the another output position to output the document.

2. The image forming apparatus according to claim 1, further comprising:

a supporter that is provided above the second output section and below the first output section and that supports the recording medium to be inverted when the image forming unit forms images onto both faces of the recording medium, wherein the supporter is not present below the rotating member.

3. The image forming apparatus according to claim 1, wherein the rotating member serves as an upstream portion of the first output section in the output direction of the document.

4. The image forming apparatus according to claim 1, further comprising a retainer that retains the rotating member to prevent the rotating member from rotating from the output position when the image forming unit forms the image onto the recording medium.

5. The image forming apparatus according to claim 1, further comprising:

a lighting unit that emits light when the document output to the first output section or the recording medium output to the second output section is present, wherein the rotating member is capable of transmitting the light from the lighting unit.

6. The image forming apparatus according to claim 1, wherein the rotating member has a color different from a color of another portion of the first output section.

7. The image forming apparatus according to claim 1, wherein the first output section in plan view has a shape in which a downstream side thereof in the output direction of the document is cut out relative to an upstream side thereof toward a rear side of the image forming unit in the depth direction.

8. The image forming apparatus according to claim 7, wherein, in plan view, a downstream side of the rotating member in the output direction of the document is cut out relative to an upstream side thereof toward the rear side of the image forming unit in the depth direction.

9. The image forming apparatus according to claim 1, wherein the rotating member includes a protrusion that supports a lateral side of the document when the output document is smaller than an A4-size document.

10. The image forming apparatus according to claim 9, wherein a protruding height of the protrusion from an upper surface of the rotating member is lower at a downstream side thereof in the output direction of the document than at an upstream side thereof.

11. An image forming apparatus comprising:

image forming means for forming an image onto a recording medium;

image reading means for transporting a document and reading an image formed on the document, the image reading means being disposed above the image forming means in an up-down direction;

first output means that is provided in a connection section connecting the image forming means and the image reading means to each other in the up-down direction and to which the document read by the image reading means and transported in a width direction of the image forming means is output;

second output means that is provided below the first output means in the connection section and to which the recording medium having the image formed thereon by the image forming means is output; and rotating means serving as a front portion of the first output means in a depth direction of the image forming means, the rotating means being rotatable by a rotating shaft disposed at an upstream side in an output direction of the document, the rotating means being switchable between an output position and another output position to output the document, wherein the another output position is a descent position to which a downstream end of the rotating means in the output direction descends relative to the output position, wherein in a case where a size of the document is greater than or equal to a predetermined size, the rotating means switches to the output position to output the document, and wherein in a case where the size of the document is less than the predetermined size, the rotating means switches to the another output position to output the document.

* * * * *